United States Patent
Kasahara

(10) Patent No.: US 10,986,206 B2
(45) Date of Patent: Apr. 20, 2021

(54) INFORMATION PROCESSING APPARATUS, CONTROL METHOD THEREOF, AND COMPUTER READABLE MEDIUM FOR VISUAL INFORMATION SHARING

(71) Applicant: Sony Corporation, Tokyo (JP)

(72) Inventor: Shunichi Kasahara, Kanagawa (JP)

(73) Assignee: Sony Corporation

( * ) Notice: Subject to any disclaimer, the term of this patent is extended or adjusted under 35 U.S.C. 154(b) by 85 days.

(21) Appl. No.: 15/767,008

(22) PCT Filed: Sep. 29, 2016

(86) PCT No.: PCT/JP2016/078948
§ 371 (c)(1),
(2) Date: Apr. 9, 2018

(87) PCT Pub. No.: WO2017/068928
PCT Pub. Date: Apr. 27, 2017

(65) Prior Publication Data
US 2019/0068749 A1    Feb. 28, 2019

(30) Foreign Application Priority Data

Oct. 21, 2015 (JP) ................................. 2015-206950
Sep. 28, 2016 (WO) .................. PCT/JP2016/078737

(51) Int. Cl.
*H04L 29/08*    (2006.01)
*H04M 1/00*    (2006.01)
(Continued)

(52) U.S. Cl.
CPC ............ *H04L 67/32* (2013.01); *G02B 27/017* (2013.01); *G06F 3/14* (2013.01); *H04L 65/1076* (2013.01);
(Continued)

(58) Field of Classification Search
CPC ... H04L 65/403; H04L 67/32; H04L 65/1076; H04L 65/4076; H04L 65/4084;
(Continued)

(56) References Cited

U.S. PATENT DOCUMENTS 8,897,920 B2 * 11/2014 Wang .................... B25J 5/00
                                                                700/264
9,260,122 B2 *  2/2016 Haas .................. B61L 23/042
(Continued)

FOREIGN PATENT DOCUMENTS

JP       2003296239 A    10/2003
JP       2004222254 A     8/2004
(Continued)

OTHER PUBLICATIONS

Rolland JP, Biocca F, Hamza-Lup F, Ha Y, Martins R. Development of head-mounted projection displays for distributed, collaborative, augmented reality applications. Presence: Teleoperators & Virtual Environments. Oct. 2005;14(5):528-49. (Year: 2005).*

(Continued)

*Primary Examiner* — John A Follansbee
*Assistant Examiner* — James N Fiorillo
(74) *Attorney, Agent, or Firm* — Lerner, David, Littenberg, Krumholz & Mentlik, LLP

(57) ABSTRACT

An information processing apparatus that provides content information, a control method thereof, and a computer program. In a case where a predetermined condition regarding a request of access such as capacity for a communication band and a number of requests of access is satisfied when requests of direct or indirect access to content information associated with a first user from information terminal apparatuses of a plurality of second users are received, the information processing apparatus controls provision of information to each of the information terminal apparatuses (Continued)

on a basis of priority set for each information terminal apparatus.

7 Claims, 14 Drawing Sheets

(51) Int. Cl.
| | |
|---|---|
| H04N 5/225 | (2006.01) |
| H04N 21/218 | (2011.01) |
| H04N 7/15 | (2006.01) |
| H04N 21/266 | (2011.01) |
| G02B 27/01 | (2006.01) |
| H04N 21/414 | (2011.01) |
| H04N 21/438 | (2011.01) |
| G06F 3/14 | (2006.01) |
| H04L 29/06 | (2006.01) |

(52) U.S. Cl.
CPC ...... *H04L 65/4076* (2013.01); *H04L 65/4084* (2013.01); *H04M 1/00* (2013.01); *H04N 5/225* (2013.01); *H04N 7/15* (2013.01); *H04N 21/218* (2013.01); *H04N 21/266* (2013.01); *H04N 21/41407* (2013.01); *H04N 21/4383* (2013.01); *G06F 3/1454* (2013.01)

(58) Field of Classification Search
CPC ... H04L 67/26; H04L 67/2833; H04L 65/607; G06F 3/011; G06F 3/013; G06F 3/017; G06F 3/041; G06F 3/165; G06F 3/0325; G06F 3/014; G06F 3/1454; H04N 21/218; H04N 21/266; H04N 21/4383; H04N 21/41407; H04N 21/00
USPC .................................................. 709/217, 219
See application file for complete search history.

(56) References Cited

U.S. PATENT DOCUMENTS

| | | | | |
|---|---|---|---|---|
| 9,538,160 | B1* | 1/2017 | Cole | H04N 13/271 |
| 9,715,899 | B2* | 7/2017 | Guckenberger | G11B 27/105 |
| 9,898,864 | B2* | 2/2018 | Shapira | G06F 3/017 |
| 2004/0167806 | A1* | 8/2004 | Eichhorn | G16H 30/40 |
| | | | | 705/3 |
| 2008/0297589 | A1* | 12/2008 | Kurtz | H04N 7/15 |
| | | | | 348/14.16 |
| 2010/0053164 | A1* | 3/2010 | Imai | G06F 3/1446 |
| | | | | 345/427 |
| 2010/0268383 | A1* | 10/2010 | Wang | B25J 9/162 |
| | | | | 700/248 |
| 2012/0069131 | A1* | 3/2012 | Abelow | G06Q 10/067 |
| | | | | 348/14.01 |
| 2012/0158846 | A1 | 6/2012 | Linder | |
| 2012/0202479 | A1* | 8/2012 | Sugitani | G08C 17/02 |
| | | | | 455/420 |
| 2012/0249591 | A1* | 10/2012 | Maciocci | G06T 19/006 |
| | | | | 345/633 |
| 2013/0035790 | A1* | 2/2013 | Olivier, III | G06K 9/00228 |
| | | | | 700/246 |
| 2013/0182186 | A1 | 7/2013 | Ikenaga | |
| 2014/0148738 | A1* | 5/2014 | Nagasaka | A61H 3/00 |
| | | | | 601/35 |
| 2014/0165076 | A1* | 6/2014 | Archer | G06F 9/5066 |
| | | | | 718/105 |
| 2015/0032810 | A1 | 1/2015 | Hunt et al. | |
| 2015/0077326 | A1* | 3/2015 | Kramer | G06F 3/0325 |
| | | | | 345/156 |
| 2016/0065669 | A1* | 3/2016 | Van Dijkman | H04W 4/029 |
| | | | | 709/204 |
| 2016/0154244 | A1* | 6/2016 | Border | G02B 27/0176 |
| | | | | 359/630 |
| 2016/0284048 | A1 | 9/2016 | Rekimoto et al. | |
| 2017/0078447 | A1* | 3/2017 | Hancock | G06F 1/3215 |
| 2017/0188058 | A1* | 6/2017 | Nakashima | H04N 21/2543 |
| 2017/0237941 | A1* | 8/2017 | Vats | H04N 7/157 |
| | | | | 348/14.07 |
| 2017/0244775 | A1* | 8/2017 | Ha | G09G 5/363 |
| 2018/0048750 | A1* | 2/2018 | Hardi | B62D 1/04 |
| 2018/0160160 | A1* | 6/2018 | Swaminathan | H04N 21/8456 |
| 2018/0181117 | A1* | 6/2018 | Rosenberg | G05D 1/0038 |
| 2018/0189568 | A1* | 7/2018 | Powderly | G06T 19/006 |
| 2018/0307303 | A1* | 10/2018 | Powderly | G06F 3/017 |
| 2018/0316948 | A1* | 11/2018 | Todd | H04N 21/4753 |
| 2019/0034765 | A1* | 1/2019 | Kaehler | G06K 9/00664 |
| 2019/0037166 | A1* | 1/2019 | Davis | A45F 5/02 |
| 2019/0253667 | A1* | 8/2019 | Valli | G02B 27/017 |
| 2020/0160609 | A1* | 5/2020 | Vembar | G06F 3/14 |

FOREIGN PATENT DOCUMENTS

| | | |
|---|---|---|
| JP | 2005527130 A | 9/2005 |
| JP | 2005302103 A | 10/2005 |
| JP | 2006186645 A | 7/2006 |
| JP | 2008154192 A | 7/2008 |
| JP | 2009538023 A | 10/2009 |
| JP | 2012033141 A | 2/2012 |
| JP | 2012090120 A | 5/2012 |
| JP | 2014104185 A | 6/2014 |
| JP | 2014522053 A | 8/2014 |
| WO | 2003046749 A1 | 6/2003 |
| WO | 2007135627 A2 | 11/2007 |
| WO | 2014165109 A1 | 10/2014 |
| WO | 2015122108 A1 | 8/2015 |

OTHER PUBLICATIONS

Tang A, Fakourfar O. Watching 360 videos together. InProceedings of the 2017 CHI Conference on Human Factors in Computing Systems May 2, 2017 (pp. 4501-4506). ACM. (Year: 2017).*
Rolland JP, Biocca F, Hamza-Lup F, Ha Y, Martins R. Development of head-mounted projection displays for distributed, collaborative, augmented reality applications. Presence: Teleoperators & Virtual Environments. Oct. 2005;14(5):528-49. (Year: 2005) (Year: 2005).*
Tang A, Fakourfar O. Watching 360 videos together. InProceedings of the 2017 CHI Conference on Human Factors in Computing Systems May 2, 2017 (pp. 4501-4506). ACM. (Year: 2017) (Year: 2017).*
Ochi, D., et al., "Live Streaming System for Omnidirectional Video", Proceedings of IEEE Virtual Reality Conference 2015, Mar. 27, 2015, p. 349-350, ISBN: 978-1-4799-1727-3.
Ochi, D., et al., "Live Streaming System for Omnidirectional Video", Proceedings of IEEE Virtual Reality Conference 2015, Mar. 27, 2015, p. 349-350, ISBN: 978-1-4799-1727-3, Abstract only (2 pgs.).
Kasahara, S., et al. "JackIn: Integrating First-Person View with Out-of-Body Vision Generation for Human-Human Augmentation", Proceedings of the 5th Augmented Human International Conference (AH '14), Mar. 9, 2014, p. 1-8, ISBN:978-1-4503-2761-9 (8 pgs.).
International Search Report corresponding to PCT/JP2016/078948, dated Nov. 8, 2016 (4 pgs.).
Chinese Search Report for Application No. CN 201680060704.5 dated Apr. 1, 2020, 2 pages.
European Examination Report for Application No. EP 16857245.1 dated Apr. 29, 2020, 9 pages.

* cited by examiner

INFORMATION PROCESSING APPARATUS, CONTROL METHOD THEREOF, AND COMPUTER READABLE MEDIUM FOR VISUAL INFORMATION SHARING

CROSS-REFERENCE TO RELATED APPLICATIONS

This application is a national phase entry under 35 U.S.C. § 371 of International Application No. PCT/JP2016/078948 filed Sep. 29, 2016, which claims the priority from Japanese Patent Application No. 2015-206950 filed in the Japanese Patent Office on Oct. 21, 2015, and International Application No. PCT/JP2016/078737, filed on Sep. 28, 2016, the entire contents of which are hereby incorporated by reference.

TECHNICAL FIELD

The technology disclosed in the present specification relates to an information processing apparatus that provides content information, a control method thereof, and a computer program.

BACKGROUND ART

The technology is known that allows a user to access a sight (scene from a mobile object other than the user) from a person or an object other than the user.

For example, there has been proposed a mobile camera system that remotely acquires an image captured by a mobile camera mounted on a mobile object such as a vehicle (e.g., see Patent Literature 1). In addition, there has been proposed an image processing system that provides a person who wears a head-mounted display with information similar to visual information acquired by a person who wears eyeglasses in which an imaging sensing wireless apparatus is disposed (e.g., see Patent Literature 2). In addition, there has been proposed an image display system in which a display apparatus side that displays a captured image of a mobile object designates, for an imaging apparatus of the mobile body, a viewpoint position and a line-of-sight direction for performing imaging, and speed at the time of imaging (e.g., see Patent Literature 3).

Further, the telepresence technology has also been proposed that transmits, through an interval such as the sight of a robot in a remote location, a sensation that a person feels as if the person were on the spot, and provides an interface for operating an object in the remote location (e.g., see Patent Literature 4).

CITATION LIST

Patent Literature

Patent Literature 1: JP 2006-186645A
Patent Literature 2: JP 2004-222254A
Patent Literature 3: JP 2008-154192A
Patent Literature 4: JP 2014-522053T
Patent Literature 5: JP 2014-104185A
Patent Literature 6: JP 2005-302103A

DISCLOSURE OF INVENTION

Technical Problem

An object of the technology disclosed in the present specification is to provide an information processing apparatus that provides content information, a control method thereof, and a computer program.

Solution to Problem

The technology disclosed in the present specification is devised in view of the above-described problem, and a first aspect thereof is an information processing apparatus including: an access reception unit configured to receive requests of direct or indirect access to content information associated with a first user from information terminal apparatuses of a plurality of second users; and a control unit configured to control provision of information to each of the information terminal apparatuses on a basis of set priority when a predetermined condition regarding the received requests of access is satisfied.

In addition, a second aspect of the technology disclosed in the present specification is a control method for an information processing apparatus, the control method including: an access reception step of receiving requests of direct or indirect access to content information associated with a first user from information terminal apparatuses of a plurality of second users; and a control step of controlling provision of information to each of the information terminal apparatuses on a basis of set priority when a predetermined condition regarding the received requests of access is satisfied.

In addition, a third aspect of the technology disclosed in the present specification is a computer program described in a computer-readable format, the computer program causing a computer to execute: an access reception step of receiving requests of direct or indirect access to content information associated with a first user from information terminal apparatuses of a plurality of second users; and a control step of controlling provision of information to each of the information terminal apparatuses on a basis of set priority when a predetermined condition regarding the received requests of access is satisfied.

Advantageous Effects of Invention

According to the technology disclosed in the present specification, it is possible to provide an information processing apparatus that provides content information, a control method thereof, and a computer program.

Note that the advantageous effects described in this specification are merely for the sake of example, and the advantageous effects of the present invention are not limited thereto. Furthermore, in some cases the present invention may also exhibit additional advantageous effects other than the advantageous effects given above.

Further objectives, features, and advantages of the technology disclosed in this specification will be clarified by a more detailed description based on the exemplary embodiments discussed hereinafter and the attached drawings.

MODE(S) FOR CARRYING OUT THE INVENTION

Hereinafter, an embodiment of the technology disclosed in the present specification will be described in detail with reference to the drawings.

A. Overview of System

Figure 1:
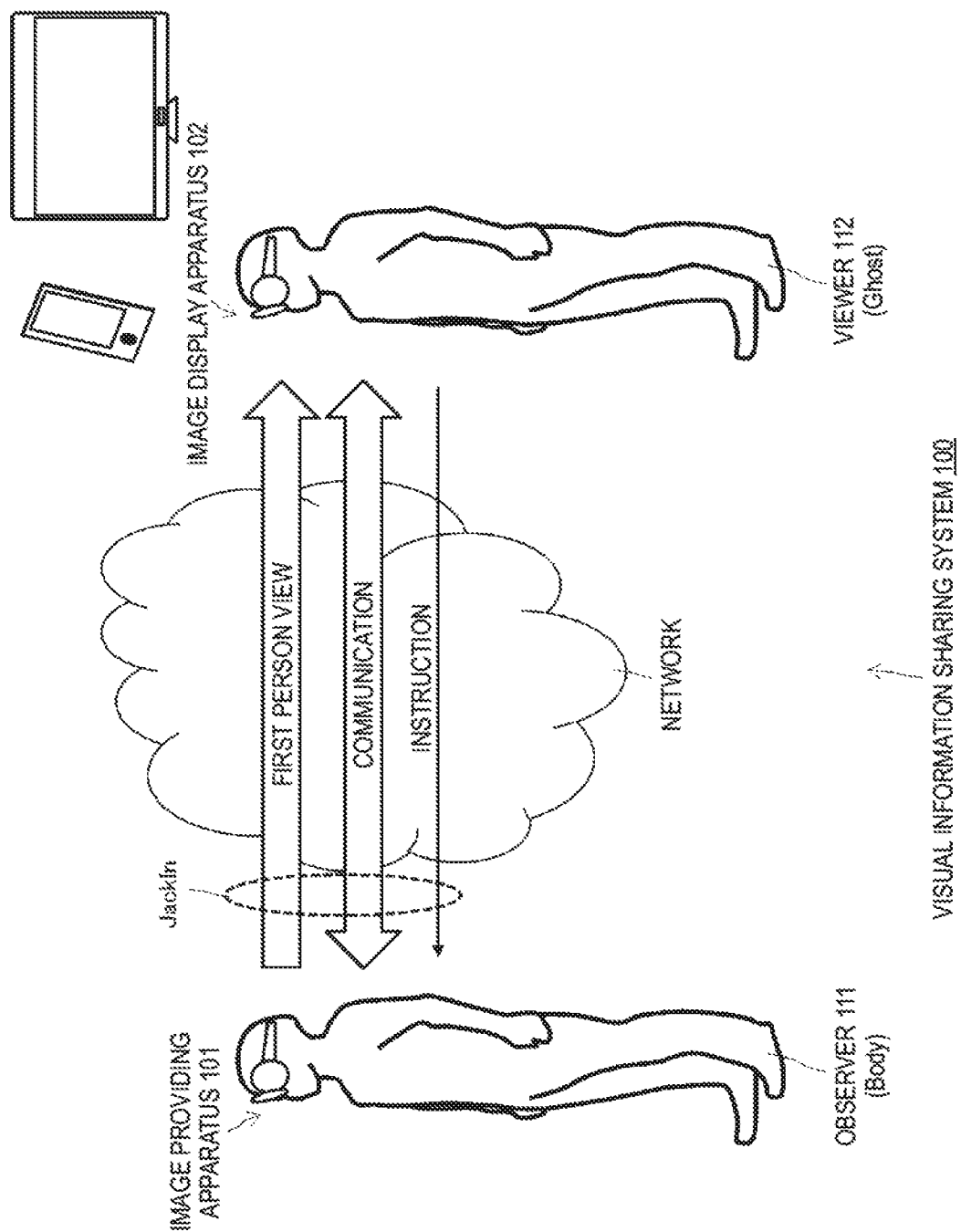
FIG. 1 is a diagram illustrating an overview of a visual information sharing system 100 to which technology disclosed in the present specification is applied.

FIG. 1 illustrates the overview of a visual information sharing system 100 to which the technology disclosed in the present specification is applied. The illustrated visual information sharing system 100 includes the combination of an image providing apparatus 101 that provides an image obtained by capturing an image of a site, and an image display apparatus 102 that displays the image provided from the image providing apparatus 101. The image providing apparatus 101 may be regarded as an information processing apparatus or an information terminal apparatus.

The image providing apparatus 101 specifically includes a camera-equipped see-through head-mounted display mounted on the head of an observer 111 who does actually activities on a site. The "see-through" head-mounted display here may be basically an optically transmissive head-mounted display, but may also be a video see-through head-mounted display. The camera mounted on the head-mounted display provides video obtained by performing imaging substantially in the line-of-sight direction of the observer 111. That is, the image providing apparatus 101 may be regarded as a portable information processing apparatus for a user. Note that the image providing apparatus is not limited to an apparatus worn on the head. As long as the image providing apparatus is an apparatus capable of acquiring imaging information regarding the area around the observer 111, the configuration of the apparatus is not limited in particular.

Meanwhile, it is assumed that the image display apparatus 102 is disposed apart from the site, that is, the image providing apparatus 101, and the image providing apparatus 101 and the image display apparatus 102 communicate with each other via a network. The term "apart" here includes not only a remote location, but also a situation in which the image providing apparatus 101 and the image display apparatus 102 are slightly (e.g., approximately several meters) apart from each other in the same room. In addition, it is also assumed that data is exchanged between the image providing apparatus 101 and the image display apparatus 102 via a server apparatus (not illustrated).

The image display apparatus 102 is, for example, a head-mounted display worn by a person who is not on the site (viewer of captured image) 112. By using an immersive head-mounted display for the image display apparatus 102, the viewer 112 is able to experience the same scene as that of the observer 111 more realistically. However, a see-through head-mounted display may also be used for the image display apparatus 102.

In addition, the image display apparatus 102 is not limited to a head-mounted display, but may be, for example, a wrist-watch display. Alternatively, the image display apparatus 102 does not have to be a wearable terminal, but may be a multifunctional information terminal such as a smartphone or a tablet, a general monitor display of a computer screen, a television receiver or the like, a game console, a projector that projects an image on a screen, or the like. In the present disclosure, the types of these terminals or apparatuses may be regarded as relevant information or attribute information of external information processing apparatuses (information terminal apparatuses). In addition, the performance or output format of the external information processing apparatuses can also be included in the relevant information of the information processing apparatuses. For example, the performance of an external information processing apparatus can include a parameter such as the resolution, the frame rate, the transmission rate, or the decoding rate. The output format of an external information processing apparatus may include a sound output, an image output, a tactile output, and the like.

The observer 111 is actually on the site and does activities with his or her body. Accordingly, the observer 111 (or the image providing apparatus 101) who is a user of the image providing apparatus 101 (information processing apparatus) will also be referred to as "Body" below. In contrast, the viewer 112 does not act on a spot with his or her body, but is able to be conscious of the spot by viewing video taken from the viewpoint of the observer 111. Thus, the viewer 112 (or the image display apparatus 102) who is a user of the image display apparatus 102 will also be referred to as "Ghost."

A Body transmits his or her surrounding situation to a Ghost, and further shares the situation with the Ghost. One of the Ghosts is able to communicate with the Body, and achieve interactions such as operation support from a location that is spaced apart. It will also be referred to as "JackIn" below for a Ghost to interact with video sent from a Body in the visual information sharing system 100.

The visual information sharing system 100 has basic functions of transmitting video from a Body to a Ghost to allow the Ghost side to view and experience the video, and establishing communication between the Body and the Ghost. By using the latter communication function, a Ghost is able to interact with a Body according to intervention from a remote location, such as "visual intervention" that allows the Ghost to intervene in the vision of the Body, "auditory intervention" that allows the Ghost to intervene in the hearing of the Body, "body intervention" that allows the Ghost to move or stimulate the body of the Body or a part of the body, and "alternative conversation" that allows the Ghost to talk on a site instead of the Body. It is also possible to say that JackIn offers a plurality of communication channels such as "visual intervention," "auditory intervention," "body intervention," and "alternative conversation." The details of "visual intervention," "auditory intervention," "body intervention," and "alternative conversation" will be described below.

The Ghost is able to instruct the Body about behavior on a site through "visual intervention," "auditory intervention," "body intervention," or "alternative conversation." For example, the visual information sharing system 100 is usable for operation support in various industrial fields such as a medical field including surgery and the like, and a construction site of a construction work and the like, instructions about control of an airplane and a helicopter and guidance thereof, navigation of a driver of an automobile, coaching, instructions in sports, or the like.

For example, in addition to the case where a Body wants to share his or her vision with another person, in the case where the Body wants (or has) to be assisted, instructed, guided, and navigated by another person regarding operation that the Body is currently performing according to the sight intervention or the like, the Body takes the initiative in performing JackIn with an appropriate Ghost (Body initiative start).

Further, in addition to the case where a Ghost wants to view video of a site without visiting the site, in the case where, by performing sight intervention or the like, the Ghost wants (or has) to assist, instruct, guide, and navigate another person regarding operation that the other person is currently performing, the Ghost takes the initiative in performing JackIn with the corresponding Body (Ghost initiative start).

However, when the Body is subjected to visual intervention, auditory intervention, body intervention, or conversational intervention with no restriction, the behavior of the Body is interrupted by the Ghost, or the behavior of the Body is hindered and put in danger in some cases, and the privacy is sometimes invaded. Meanwhile, the Ghost also has some video that the Ghost does not want to watch in some cases, or the Ghost is not able to provide services such as appropriate assistance, instruction, guidance, and navigation to the Body in some cases even if asked. Thus, JackIn of the Ghost to the Body and intervention in the Body from the Ghost in a JackIn state may be restricted at a certain level.

Figure 2:
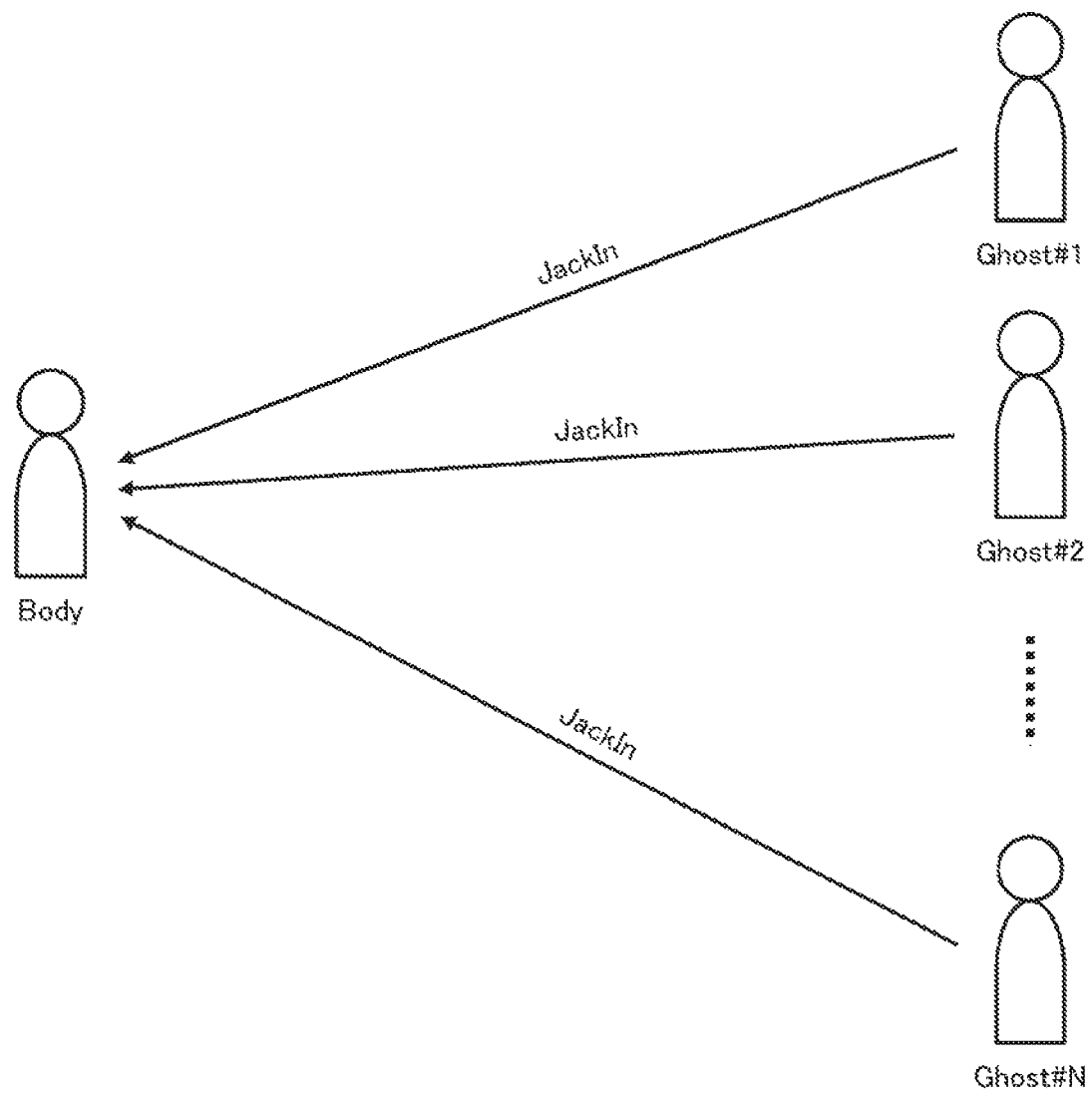
FIG. 2 is a diagram schematically illustrating one-to-N network topology.
Figure 3:
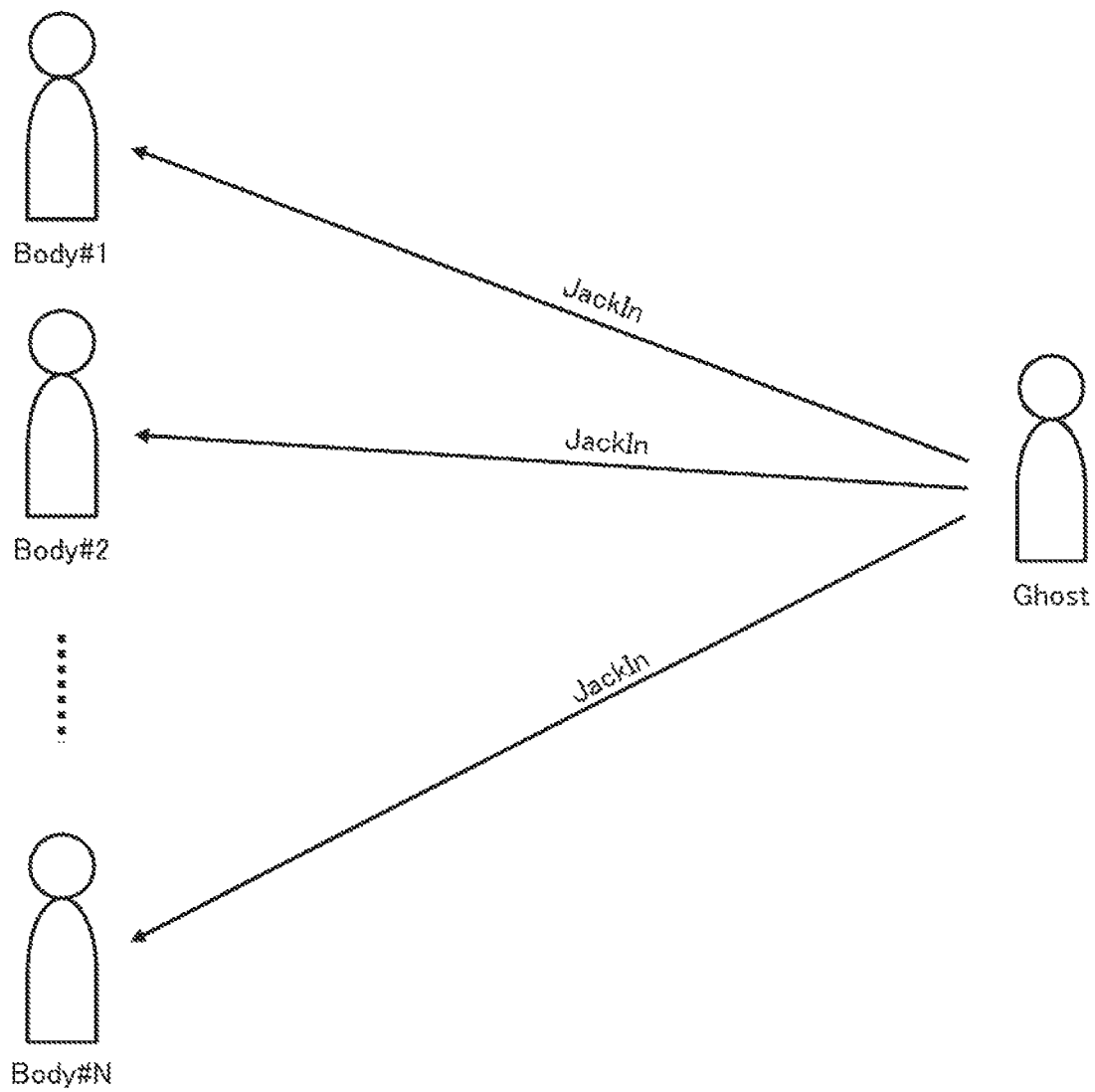
FIG. 3 is a diagram schematically illustrating N-to-one network topology.
Figure 4:
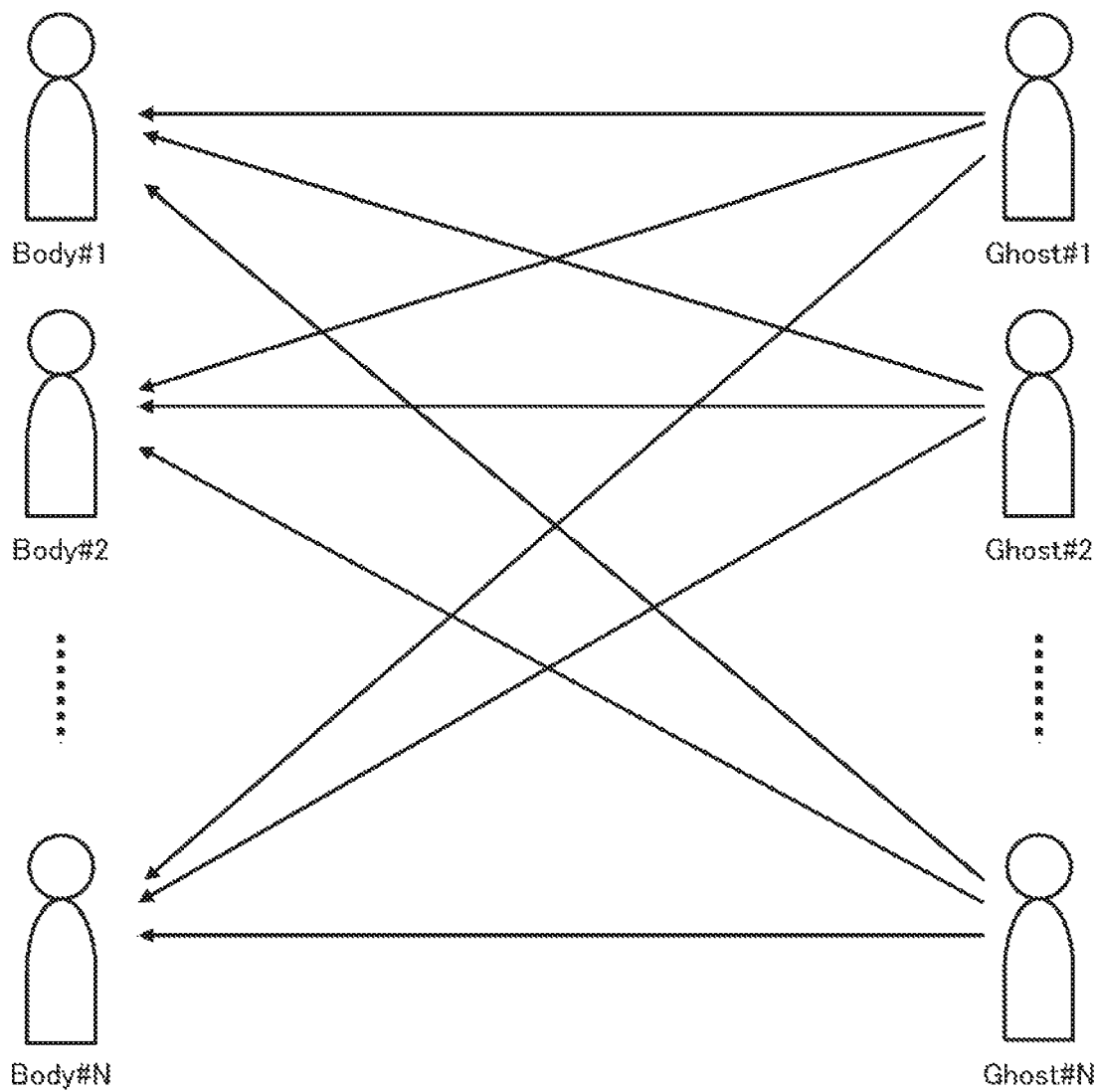
FIG. 4 is a diagram schematically illustrating N-to-N network topology.

Note that, for the sake of simplification, FIG. 1 illustrates one-to-one network topology of a Body and a Ghost in which only the one image providing apparatus 101 and the one image display apparatus 102 exist. The following are also assumed: one-to-N network topology as illustrated in FIG. 2 in which one Body and a plurality (N) of Ghosts simultaneously perform JackIn, N-to-one network topology as illustrated in FIG. 3 in which a plurality (N) of Bodies and one Ghost simultaneously perform JackIn, and N-to-N network topology as illustrated in FIG. 4 in which a plurality (N) of Bodies and a plurality (N) of Ghosts simultaneously perform JackIn are also assumed.

In addition, switching one apparatus from a Body to a Ghost, switching one apparatus from a Ghost to a Body in contrast, and simultaneously providing one apparatus with the role of a Body and the role of a Ghost are also assumed. Network topology (not illustrated) is also assumed in which one apparatus performs JackIn to a certain Body as a Ghost, and simultaneously functions as a Body for another Ghost to establish a daisy-chain connection between three or more apparatuses. In any network topology, a server apparatus (not illustrated) is sometimes interposed between a Body and a Ghost.

B. Functional Configuration

Figure 5:
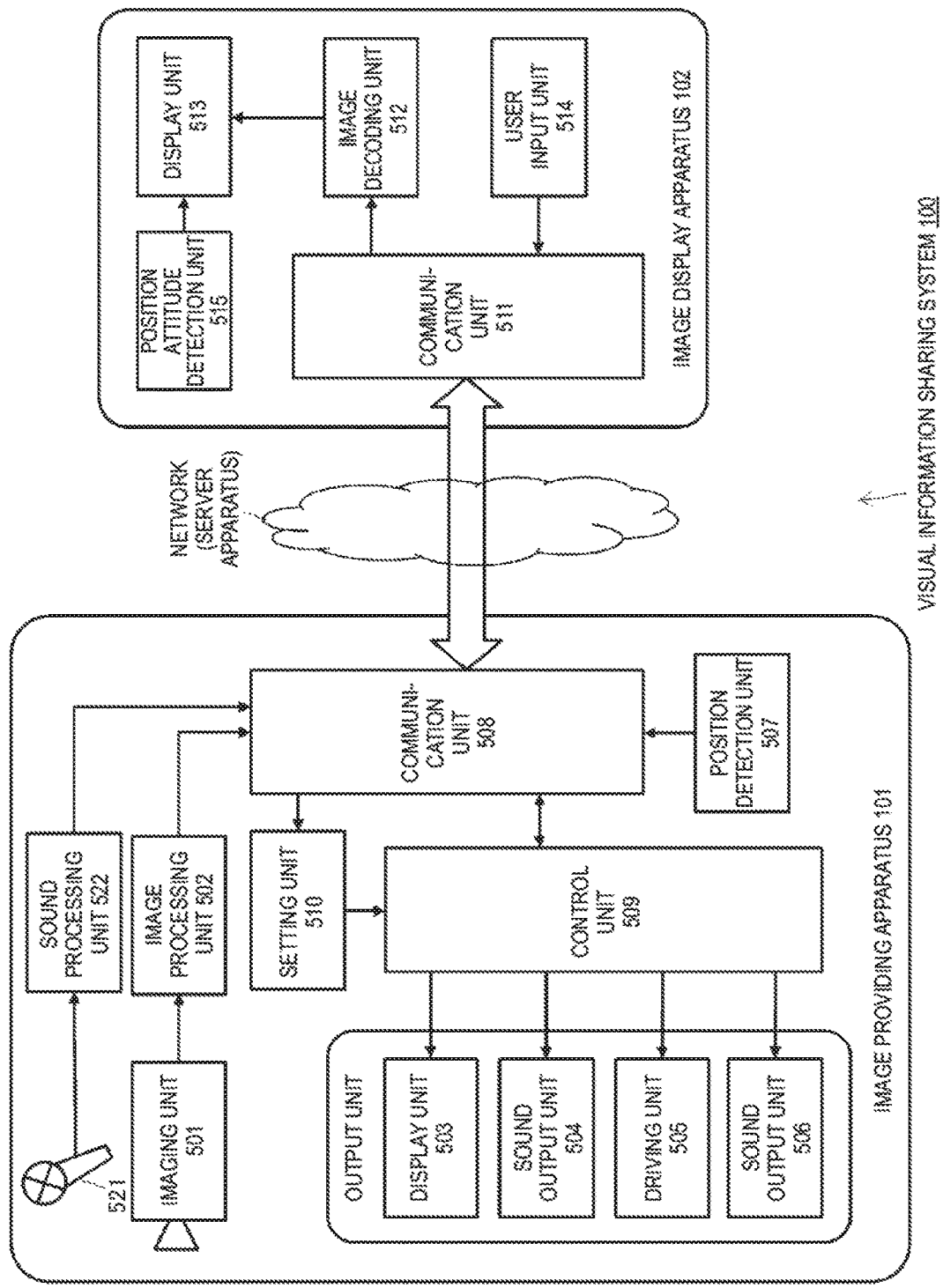
FIG. 5 illustrates a functional configuration example of an image providing apparatus 101 and an image display apparatus 102.

FIG. 5 illustrates a functional configuration example of the image providing apparatus 101 and the image display apparatus 102.

The image providing apparatus 101 is an apparatus to be used by a user (observer 112) who acts the role of a Body. In the example illustrated in FIG. 5, the image providing apparatus 101 includes an imaging unit 501, an image processing unit 502, a display unit 503 serving as an output unit, a first sound output unit 504, a drive unit 505 and a second sound output unit 506, a position detection unit 507, a communication unit 508, a control unit 509, and a setting unit 510. Each of these components 501 to 510 of the image providing apparatus 101 is directly or indirectly provided to the predetermined housing as illustrated in FIG. 1.

The imaging unit 501 includes a camera, and is attached to the head of a Body, that is, the observer 111, for example, to image the area in the line-of-sight direction of the observer 111. Alternatively, a full-dome camera may be used for the imaging unit 501 to provide a 360-degree full-dome image showing the area around the Body. However, the full-dome image does not necessarily have to be a 360-degree image, but the field of view may be partially missing. In addition, the full-dome image may be a half-dome image that does not include a floor surface containing little information (the same applies to the following). Note that the imaging unit 501 only has to acquire captured image information, for example, in the real space, in which the Body, that is, the observer 111 exists, and a variety of apparatus configurations can be employed.

As described below, the space in which the Body, that is, the observer 111 exists can also be defined as a virtual space instead of the real space. As described above, the imaging unit 501 only has to acquire information of the space in which the observer 111 exists, but does not have to be directly provided to the image providing apparatus 101. For example, captured image information may be acquired from an imaging apparatus provided in the space in which the observer 111 exists.

The image processing unit 502 processes an image signal output from the imaging unit 501. In the case where video captured by the imaging unit 501 is directly streamed, a Body looks around or changes the line-of-sight direction at his or her own will. Accordingly, the Ghost has to view video that shakes strongly, and there is a concern that the Ghost will be sick. In addition, the Ghost sometimes wants to view another part on which the Body does not focus. The image processing unit 502 then simulatively constructs a surrounding space on the basis of continuous images captured by the imaging unit 501. The "real space" will be simply referred to as "space" below in some cases. Specifically, the image processing unit 502 performs space recognition, in real time, on video (full-dome image) captured by the imaging unit 501, and spatially joins a current video frame and a past video frame together, thereby rendering video from the viewpoint of a virtual camera controlled by the Ghost. The space recognition is based on the simultaneous localization and mapping (SLAM) recognition technology or the like. The video rendered at the viewpoint of the virtual camera is video watched from a viewpoint that is simulatively out of the body of the Body rather than video watched from the viewpoint of the Body. Thus, the Ghost side is able to observe the environment around the Body independently from the motion of the Body, so that it is possible to stabilize the shaking of the video to prevent sickness and view another part on which the Body does not focus.

The sound input unit 521 includes a microphone or the like, and picks up sound generated around the observer 111. The sound processing unit 522 performs signal processing on sound signals from the sound input unit 521, and performs audio coding processing such as advanced audio coding (AAV) as needed.

The display unit 503 displays and outputs information sent from the image display apparatus 102, thereby allowing the Ghost to intervene in the vision of the Body. In the case where the image providing apparatus 101 is configured as a see-through head-mounted display as described above, the display unit 503 superimposes and displays an augmented reality (AR) image that expresses the consciousness of the Ghost who shares experience with the Body on the vision (i.e., scenery of the real world) of the observer 111. The AR image includes an image such as a pointer, an annotation, or the like showing, for example, a location indicated by the Ghost. Thus, the Ghost is able to intervene in the vision of the Body through communication with the Body, and interact with the Body on the site.

The first sound output unit 504 includes, for example, earphones, headphones, or the like, and causes a Body to listen to information sent from the image display apparatus 102, thereby allowing a Ghost to intervene in the hearing of the Body. The image display apparatus 102 transmits information regarding the consciousness of the Ghost who shares experience with the Body. The image providing apparatus 101 side converts the received information into sound signals, and outputs sound from the first sound output unit 504, thereby causing the Body, that is, the observer 111 to listen to the sound. Alternatively, sound signals uttered by the Ghost who is currently viewing the video sent from the Body are transmitted from the image display apparatus 102 as they are. The image providing apparatus 101 side outputs the received sound signals in the form of sound from the first sound output unit 504 as they are, thereby causing the Body, that is, the observer 111 to listen to the sound. In addition, the sound volume, sound quality, output timing, and the like of sound output from the first sound output unit 504 may be adjusted as appropriate. Alternatively, image information or character information (text information) coming from the image display apparatus 102 may be converted into sound signals, and output from the first sound output unit 504 in the form of sound. Thus, the Ghost is able to intervene in the hearing of the Body through communication with the Body, and interact with the Body on the site.

The drive unit 505 moves or stimulates the body of a Body or a part of the body to allow a Ghost to intervene in the body of the Body. The drive unit 505 includes, for example, an actuator for applying tactile stimulation or electrical stimulation (which is slight electrical stimulation, and thus does not harm health) to the body of the observer 111. Alternatively, the drive unit 505 includes an apparatus (e.g., see Patent Literature 5) for supporting or restricting the motion of the body by driving a powered suit or exoskeleton worn on arms, hands, legs, or the like of the observer 111. Thus, the Ghost is able to intervene in the body of the Body through communication with the Body, and interact with the Body on the site.

The second sound output unit 506 includes, for example, a wearable speaker or the like worn by a Body, and outputs information or sound signals coming from the image display apparatus 102 to the outside in the form of sound. The sound output from the second sound output unit 506 sounds on a site as if the Body himself/herself talked. Thus, a Ghost is able to converse with people on the site where the Body is, or issue an instruction with sound instead of the Body (alternative conversation).

The position detection unit 507 detects current position information of the image providing apparatus 101 (i.e., Body) by using, for example, global positioning system (GPS) signals. The detected position information is used, for example, for a Ghost to search for a Body who is in a place desired by the Ghost.

The communication unit 508 is mutually connected to the image display apparatus 102 via a network, transmits video captured by the imaging unit 501 and space information, and communicates with the image display apparatus 102. The communication means of the communication unit 508 may be wireless or wired communication means, and is not limited to a specific communication standard. In addition, the case is also assumed where the communication unit 508 performs information communication with the image display apparatus 102 via a server apparatus (not illustrated).

The setting unit 510 performs authentication processing on the image display apparatus 102 (or a Ghost who is a user thereof), which is connected to the setting unit 510 via a network, or checks attribute information (relevant information) of the Ghost to set the range of information to be provided to the image display apparatus 102, or set the range of information to be output from the output unit among information received from the image display apparatus 102. Here, various kinds of information to be provided from a Body to a Ghost may be regarded as content information associated with the Body. In addition, in the present disclosure, the range of information to be provided to a Ghost may be defined as an information amount provided to the Ghost. For example, the setting unit 510 sets one or both of video input from the imaging unit 501 and sound information input from the sound input unit 521 as the range of information to be provided to the image display apparatus 102 on the basis of attribute information of a Ghost. This can restrict the information amount to be provided from a Body to a Ghost on the basis of the attribute information (relevant information) of the Ghost. For example, at least one of sound information, video information, tactile information, and the like to be provided from a Bosy to a Ghost can be restricted or suppressed. In addition, the setting unit 510 sets the range of information to be output by the output unit among information signals such as sound information, text information, and image information to be received from the image display apparatus 102, on the basis of attribute information of a Ghost. This can cause it to be set whether to make an output for "visual intervention," "auditory intervention," "body intervention," or "alternative conversation" from a Ghost to a Body, that is, the range of information to be output by the various output units can be set.

In addition, when a predetermined condition regarding a request of access received from the image display apparatus 102 is satisfied, the setting unit 510 sets priority according to which information is provided to each image display apparatus 102. The request of access will be simply referred to as "access" in some cases below. The predetermined condition here is, for example, a condition that the capacity for the network communication band between the image providing apparatus 101 and the image display apparatus 102 exceeds a predetermined limit, the number of times access is received exceeds a predetermined limit, or the like. More specifically, the number of times access is received exceeding a predetermined limit may be regarded as the number of image display apparatuses 102 that require real-time access to content information provided from the image providing apparatus 101 exceeding the number of accessible apparatuses (i.e., maximum number of apparatuses). The setting unit 510 then sets the priority of each image display apparatus 102 on the basis of attribute information, or the like of a Ghost which includes personal information of a user and information specific to the image display apparatus 102.

The control unit 509 has, for example, the functions corresponding to a central processing unit (CPU) and a graphic processing unit (GPU). The control unit 509 controls the output operation from the output unit on the basis of the range of information which is set in accordance with an authentication result of the setting unit 510. In addition, when the predetermined condition regarding the request of access received from the image display apparatus 102 is satisfied, the control unit 509 may be considered to control the provision of information to each image display apparatus 102 on the basis of the priority set by the setting unit 510.

For example, in the case where image information is set as the range of information (in other words, the image display apparatus 102 is permitted to perform only visual intervention as a result of authentication processing), the control unit 509 executes only a display output from the display unit 503. In addition, in the case where sound information is also set as the range of information (in other words, the image display apparatus 102 is permitted to perform not only visual intervention, but also auditory intervention), the control unit 509 executes both a display output from the display unit 503 and a sound output from the first sound output unit 504.

The range of information to be provided from the image providing apparatus 101 to the image display apparatus 102 or the range of information to be received from the image display apparatus 102 (in other words, the range of intervention that a Body permits a Ghost) is defined as a permission level. Meanwhile, the range within which a Ghost intervenes in a Body is defined as a mission level (described below). This intervention from the Ghost to the Body, that is, various signals issued for access may be regarded as a request of access from the Ghost to the Body. For example, in FIG. 5, a component of a server apparatus which receives a request of access issued from the image display apparatus 102 may be regarded as an access reception unit. Alternatively, at least one of the communication unit 508, the setting unit 510, and the control unit 509 of the image providing apparatus 101 may be regarded as an access reception unit. However, it is also possible to configure the visual information sharing system 100 such that the above-described processing performed by the setting unit 510 and the control unit 509 is executed by not the image providing apparatus 101, but a server (not illustrated) interposed between the image providing apparatus 101 and the image display apparatus 102. In this case, the server apparatus may be regarded as an information processing apparatus in the present disclosure. Note that, in FIG. 5, the image providing apparatus 101 receives a request of access from a Ghost indirectly via the server apparatus, that is, directly from the server apparatus. The technology of the present disclosure is not limited thereto. The image providing apparatus 101 may directly receive a request of access from an image display apparatus.

In addition, when the predetermined condition regarding the occurring access is satisfied like the capacity for the communication band exceeds a limit, the number of times access is received exceeds a limit, or the like, the control unit 509 transmits information (video captured by the imaging unit 501, sound input with the sound input unit 521, or the like) to the image display apparatus 102 on the basis of priority set by the setting unit 510.

Meanwhile, the image display apparatus 102 is an apparatus to be used by a user (viewer 112) who acts the role of a Ghost. In the example illustrated in FIG. 5, the image display apparatus 102 includes a communication unit 511, an image decoding unit 512, a display unit 513, a user input unit 514, and a position attitude detection unit 515.

The communication unit 511 is mutually connected to the image providing apparatus 101 via a network, receives video from the image providing apparatus 101, and communicates with the image providing apparatus 101. The communication means of the communication unit 511 may be wireless or wired communication means, and is not limited to a specific communication standard. However, it is assumed that the communication means is compatible with the communication unit 508 of the image providing apparatus 101 side. In addition, the case is also assumed where the communication unit 511 performs information communication with the image providing apparatus 101 via a server apparatus (not illustrated).

The image decoding unit 512 performs decoding processing on an image signal received by the communication unit 511 from the image providing apparatus 101. The display unit 513 displays and outputs a full-dome image that has been decoded by the image decoding unit 512. Note that the processing (described above) of rendering viewpoint video out of the body of a Body from viewpoint video of the Body may be performed by not the image processing unit 502 of the image providing apparatus 101 side, but the image decoding unit 512.

The position attitude detection unit 515 detects the position and attitude of the head of the viewer 112. The detected position and attitude correspond to the current viewpoint position and line-of-sight direction of a Ghost. It is possible to control the viewpoint position and line-of-sight direction of the virtual camera (described above) to create viewpoint video simulatively out of the body of a Body from the viewpoint video of the Body on the basis of the position and attitude of the head of the viewer 112 detected by the position attitude detection unit 515.

The display unit 513 includes, for example, a head-mounted display worn by the viewer 112 serving as a Ghost. By using an immersive head-mounted display for the display unit 513, the viewer 112 can experience the same scene as that of the observer 111 more realistically. Video viewed by the viewer 112, that is, the Ghost is not the Body's viewpoint video itself, but is a surrounding space simulatively constructed from continuous images thereof (viewpoint video simulatively out of the body of the Body) (described above). In addition, it is possible to perform control the virtual camera to perform head tracking on the Ghost, that is, follow the viewpoint position and line-of-sight direction of the viewer 112 detected by the position attitude detection unit 515, and move the angle of display view of the display unit 513.

A wearable terminal such as a see-through head-mounted display or a wrist-watch display may be used as the display unit 513 instead of an immersive head-mounted display. Alternatively, the display unit 513 does not have to be a wearable terminal, but may be a multifunctional information terminal such as a smartphone or a tablet, a general monitor display such as a computer screen or a television receiver, a game console, a projector that projects an image on a screen, or the like.

The user input unit 514 is a device for allowing the viewer 112 serving as a Ghost to input the Ghost's own intention or consciousness in response to the observation of video that is sent from a Body and displayed on the display unit 513.

The user input unit 514 includes, for example, a coordinate input apparatus such as a touch panel, a mouse, or a joystick. By touching, click operation on the mouse, or the like, a Ghost is able to directly indicate a place in which the Ghost is particularly interested on a screen on which video sent from a Body is displayed. The Ghost gives an indication on pixel coordinates of video that the Ghost is currently viewing. However, the captured video of the Body side always changes, and the indication on the pixel coordinates is meaningless. The user input unit 514 then identifies, by performing image analysis or the like, position information in the three-dimensional space corresponding to a pixel position that the Ghost indicates by touching, performing click operation, or the like on the screen, and transmits the position information in the three-dimensional space to the image providing apparatus 101. Thus, the Ghost is able to perform pointing that achieves fixation not on the pixel coordinates, but in a space.

In addition, the user input unit 514 may capture eye movement by using a captured image of the face of a Ghost taken by a camera or an eye potential, calculate a place at which the Ghost is gazing, and transmit information for identifying the place to the image providing apparatus 101. At that time, the user input unit 514 also identifies, by performing image analysis or the like, position information in the three-dimensional space corresponding to a pixel position at which the Ghost is gazing, and transmits the position information in the three-dimensional space to the image providing apparatus 101. Thus, the Ghost is able to perform pointing that achieves fixation not on the pixel coordinates, but in a space.

In addition, the user input unit 514 includes a character input apparatus such as a keyboard. When a Ghost views sent video to have the same experience as that of a Body, the Ghost is able to input an intention that the Ghost wants to let the Body know, consciousness that the Ghost has, and the like as character information. The user input unit 514 may transmit the character information input by the Ghost as it is to the image providing apparatus 101 or may convert the character information in another signal format such as sound signals and then transmit the signals to the image providing apparatus 101.

In addition, the user input unit 514 includes a sound input apparatus such as a microphone, and sound uttered by the Ghost is input thereto. A user input unit 414 may transmit the input sound from the communication unit 511 to the image providing apparatus 101 in the form of sound signals. Alternatively, the user input unit 514 may also perform sound recognition on the input sound to convert the input sound into character information, and transmit the input sound to the image providing apparatus 101 as character information. This conversion from sound information to character information can suppress the transmission of attribute information, that is, personal information of a Ghost to a Body via sound generated by the Ghost.

It is assumed that a Ghost indicates an object by using a demonstrative pronoun such as "that" or "this" while viewing video sent from a Body. In such a case, the user input unit 514 identifies, by performing language analysis, image analysis, or the like, position information of the object indicated by the demonstrative pronoun in the three-dimensional space, and transmits the position information in the three-dimensional space to the image providing apparatus 101. Thus, the Ghost is able to perform pointing that achieves fixation not on the pixel coordinates, but in a space.

In addition, the user input unit 514 may be a gesture input apparatus into which a body gesture and a hand gesture of a Ghost are input. Means for capturing gestures is not limited in particular. For example, the user input unit 514 may include a camera that images the movement of the limbs of a Ghost, and an image recognition apparatus that processes the captured image. In addition, a marker may be attached to the body of a Ghost to facilitate image recognition. Alternatively, the user input unit 514 includes a gyro sensor or an acceleration sensor attached to the body of the Ghost, and detects the motion of the body of the Ghost.

The user input unit 514 may transmit an input gesture from the communication unit 511 to the image providing apparatus 101, for example, as control signals for intervening in the body of a Body. In addition, the user input unit 514 may convert the input gesture into image information (coordinate information, AR image to be superimposed and displayed, character information, or the like) for intervening in the vision of the Body, or sound signals for intervening in the hearing of the Body, and transmit the image information or the sound signals from the communication unit 511 to the image providing apparatus 101. In addition, the user input unit 514 identifies, by performing image analysis or the like, position information in the three-dimensional space corresponding to a pixel position indicated by a gesture of a Ghost, and transmits the position information in the three-dimensional space to the image providing apparatus 101. Thus, the Ghost is able to perform pointing that achieves fixation not on the pixel coordinates, but in a space.

Additionally, the user input unit 514 inputs an action of a Ghost obtained on the basis of image analysis of the Ghost imaged by a camera, a detection result of a gyro sensor or an acceleration sensor attached to the body of the Ghost, or the like as an instruction to move in the virtual space (VR space) or the like.

A service that is referred to as JackIn and developed in the visual information sharing system 100 resembles the general AR technology from the perspective of superimposing and displaying an AR image. However, it is considered that JackIn is different from the normal AR technology performed by a computer in that a human (Ghost) augments another human (Body).

In addition, JackIn also resembles telepresence (described above) in some sense. However, normal telepresence and JackIn are different in that the normal telepresence is an interface for viewing the world from the viewpoint of a machine such as a robot, while, in JackIn, a human (Ghost) views the world from the viewpoint of another human (Body). In addition, telepresence presupposes that a human serves as a master and a machine serves as a slave, and the machine serving as a slave truly reproduces the motion of the human. In contrast, in the case where a human (Ghost) performs JackIn to another human (Body), the Body does not necessarily move in accordance with the Ghost, and is an independent interface.

In the above-described visual information sharing system 100, video provided from the image providing apparatus 101 to the image display apparatus 102 is not limited to real-time video observed by a Body on a site (i.e., live video captured by the imaging unit 501), but may be recorded past video. For example, the image providing apparatus 101 includes a mass storage apparatus (not illustrated) that records past video, and the past video may be distributed from the image providing apparatus 101. Alternatively, the past video recorded by the image providing apparatus 101 may be accumulated on a JackIn server (provisional name) that controls JackIn between a Body and a Ghost or another recording server, and the past video may be streamed from these servers to a Ghost (image display apparatus 102). However, in the case where the Ghost views the past video, intervention in the Body including sight intervention and auditory intervention may be regarded as being not permitted at all. This is because the video viewed by the Ghost is not the video of a site where the Body is currently performing operation, and intervention based on the past video hinders the current operation of the Body.

Note that, for the details of visual sharing between two apparatuses, for example, the specification of Patent Application No. 2013-78893, which has already been transferred to the present applicant, should also be seen. In addition, for the details of visual intervention (display of AR image) in the same system 100, for example, the specification of Patent Application No. 2013-78892, the specification of Patent Application No. 2013-78894, and the specification of Patent Application No. 2013-191464, which have already been transferred to the present applicant, should also be seen.

C. Mission-Permission (Matching Between Body and Ghost)

JackIn offers a plurality of communication channels such as "visual intervention," "auditory intervention," "body intervention," and "alternative conversation." Therefore, by starting JackIn with a Ghost, a Body is able to share the vision of the Body with the Ghost, and be assisted, instructed, guided, and navigated by the Ghost regarding operation that is currently performed through visual intervention or the like. In addition, by starting JackIn with the Body, the Ghost is able to have the same experience as that of the Body without visiting a site, and assist, instruct, guide, and navigate the Body regarding operation thereof through visual intervention or the like.

However, when the Ghost unlimitedly intervenes in the Body's own vision, hearing, or body or carries out alternative conversation, the Body's behavior is sometimes interrupted by the Ghost, or the Body's behavior is sometimes hindered and subjected to danger, and the Body's privacy is invaded in some cases. Meanwhile, the Ghost also has some video that the Ghost does not want to watch in some cases, is not able to provide services such as appropriate assistance, instruction, guidance, and navigation even if asked by the Body. That is, a mismatch between the Body and the Ghost is problematic.

Accordingly, in the present embodiment, to achieve appropriate matching between a Body and a Ghost, "permission" and "mission" are defined. The range within which the Body permits intervention from the Ghost is defined as "permission," and intervention from the Ghost is limited to the range prescribed by the permission. Meanwhile, the range of operation in which the Ghost intervenes in the Body is defined as "mission," and the range within which the Ghost is able to intervene in the Body is limited to the range prescribed by the mission.

C-1. Permission

First, permission will be described. It is possible for respective Bodies to appropriately set permissions having different levels at which intervention is permitted as exemplified below.

(Level 1) Only exchange of vision is permitted. In this case, the image providing apparatus 101 only transmits a captured image of the imaging unit 501, but does not operate the output unit at all.

(Level 2) Only exchange of vision and up to visual intervention are permitted. In this case, the image providing apparatus 101 only transmits a captured image of the imaging unit 501, and makes a display output for the display unit 503.

(Level 3) Auditory intervention is further permitted. In this case, the image providing apparatus 101 transmits a captured image of the imaging unit 501, makes a display output for the display unit 503, and makes a sound output from the first sound output unit 504.

(Level 4) All kinds of intervention including body intervention and alternative conversation are permitted. In this case, the image providing apparatus 101 is capable of further driving the drive unit 505 and outputting sound to the outside from the second sound output unit 506.

In addition, each Body may provide not uniform permission to all the Ghosts, but individual permission to each Ghost.

For example, the Body may set permission according to a user attribute of the Ghost. It is assumed that the user attribute here includes not only personal information such as the age, the sex, the personal relationship with the Body (kinship, friendship, boss and subordinate, or the like), the place of birth, the occupation, and a qualification, but also rating information of the skill of assistance target operation and information such as the past performance of the Ghost (as an assistant, instructor, or the like) (how many hours the Ghost has experienced the operation so far), a review of the Ghost, and a reputation (posting, voting result, or the like) of the Ghost from another Body (described above).

In addition, the Body does not set permission according to an attribute, but may individually set permission (permission for Mr./Ms. A, permission for Mr./Ms. B, . . . , and the like). In other words, permission may be set for each combination of a Body and a Ghost. The Body may set permission on the basis of the personal relationship with the Body, or set permission on the basis of the ability of the Ghost that the Body personally grasps. In addition, there is also a method of providing temporary permission to a Ghost by one-to-one negotiation, mediation, or the like between a Body and the Ghost (high-level permission is provided to a certain Ghost only for a predetermined period of time, and, when the period of time elapses, the permission is restored to the original-level permission). In addition, the Body may set a user who is forbidden from performing JackIn to the Body.

Simple examples of the permission settings based on a personal relationship will be shown below.

Example 1

Others are permitted only sharing of vision (level-1 permission).

Example 2

Friends are permitted up to visual intervention and auditory intervention (level-2 or level-3 permission).

Example 3

Close friends or authenticated or qualified people are specially permitted body intervention (level-4 permission). Alternatively, alternative conversation is temporarily permitted.

Other examples of the permission settings include the case where a Body charges for (i.e., monetizes) JackIn as a service. Any one of the above-described level-1 permission to level-4 permission is set for a Ghost in accordance with a charge for use paid by the Ghost, and the Ghost is able to perform JackIn with the Body.

Example 4

A Ghost who pays five dollars is permitted only sharing of vision (level-1 permission).

Example 5

A Ghost who pays ten dollars is permitted up to visual intervention and auditory intervention (level-2 or 3 permission).

Example 6

A Ghost who pays a hundred dollars is permitted body intervention (level-4 permission). Alternatively, alternative conversation is temporarily permitted.

C-2. Mission

Next, mission will be described. In the present embodiment, the range of operation in which a Ghost intervenes in a Body is defined as "mission," and the range within which the Ghost is able to intervene in the Body is limited to the range prescribed by the mission. The mission of the Ghost is set, for example, within the range of a mission to be carried out by the Ghost or the ability thereof. The mission is not freely decided by each Ghost, but it is preferable that the mission be permitted or authenticated, for example, by an authoritative organization or the like. It is possible to define missions having different levels as exemplified below in accordance with a mission or a duty to be carried out by a Ghost, the occupation, a qualification, the rating of an intervention skill, the past performance (experience time as a Ghost or the like) of the Ghost (as an assistant, an instructor, or the like), and a review and a reputation (posting, voting result, or the like) from a Body, or the like.

(Level 1) Only exchange of vision is performed. In this case, the image display apparatus 102 only displays an image received from the image providing apparatus 101.

(Level 2) Exchange of vision and up to visual intervention are performed. In this case, the image display apparatus 102 displays an image received from the image providing apparatus 101, and transmits information regarding an image (image to be superimposed and displayed and to intervene in the vision) to be displayed on the image providing apparatus 101 side.

(Level 3) Auditory intervention is further performed. In this case, the image display apparatus 102 further transmits information regarding sound (sound to which a Body should be caused to listen) to be output by the image providing apparatus 101.

(Level 4) All kinds of intervention including body intervention and alternative conversation are performed. In this case, the image display apparatus 102 further transmits information for operating the drive unit 505 and information regarding sound to be output from the second sound output unit 506 to the outside.

In the case where a Body starts JackIn with a Ghost, it is only necessary to perform filtering on the basis of personal information and attribute information of the Ghost and further compare permission designated by the Body with a mission that the Ghost has, thereby determining whether or not JackIn is possible and the range within which intervention is possible in a JackIn state. For example, filtering processing is effective when a Body takes the initiative in starting JackIn (Body initiative start) by targeting an unspecified large number of Ghosts (Large number Ghost). Note that, in the present specification, attribute information of a Ghost may be considered to include personal information of a user and information specific to the image display apparatus 102. Here, the information specific to the image display apparatus 102 can include information regarding the ID, performance, and information output format of each image display apparatus 102.

Such filtering processing may be performed on the Body side (i.e., image providing apparatus 101) or by a JackIn server (provisional name) that controls JackIn between a large number of Bodies and a large number of Ghosts.

By setting permission for a Body and setting a mission for a Ghost, it is easy to automatize processing of selecting a Ghost at the time of starting JackIn and processing of deciding the range within which the Ghost performs intervention. For example, when an unspecified large number of Ghosts perform JackIn, the Body is able to mechanically determine the level at which each Ghost is permitted intervention, which is convenient. Needless to say, it is not mechanically determined on the basis of information such as permission and mission set in advance, but may be determined on the spot whether or not it is possible to perform JackIn or an intervention level on the basis of one-to-one negotiation, mediation, or the like between a Body and a Ghost.

D. Quota Processing of Ghost

As illustrated in FIG. 2, the case where a plurality of Ghosts perform JackIn to one Body, that is, the case where a (first person) view captured by one image providing apparatus 101 is simultaneously distributed to a plurality of image display apparatuses 102 is assumed. Taking it into consideration that a Ghost intervenes in the sight, the hearing, or the like of a Body, or the like, it is preferable for the Ghost to view video of the Body in real time.

However, when a large number of Ghosts simultaneously perform JackIn, a delay in the transmission of the video problematically surfaces because of a matter of the communication band or the like.

The Body may then set a quota (upper limit) on Ghosts who simultaneously perform JackIn. When a Ghost newly performs JackIn beyond a quota in the case where the quota is set on Ghosts capable of performing JackIn, the Ghost beyond the quota is expelled to restrict the number of Ghosts to which real-time video is distributed within the quota.

Here, the quota is a number which is decided, for example, in accordance with a limit of the capacity for the communication band, or the like. Alternatively, the quota may be the number of Ghosts that a Body permits to intervene in the Body.

D-1. Method for Selecting Ghost to be Expelled

In the case where a quota is set on Ghosts capable of performing JackIn, it is necessary to perform processing of selecting a Ghost to be expelled when a Ghost newly performs JackIn to a Body beyond the quota. That is, Ghosts may be considered to include at least Ghosts having relatively high priority and Ghosts having relatively low priority. For example, the following methods can be used.

Figure 6:
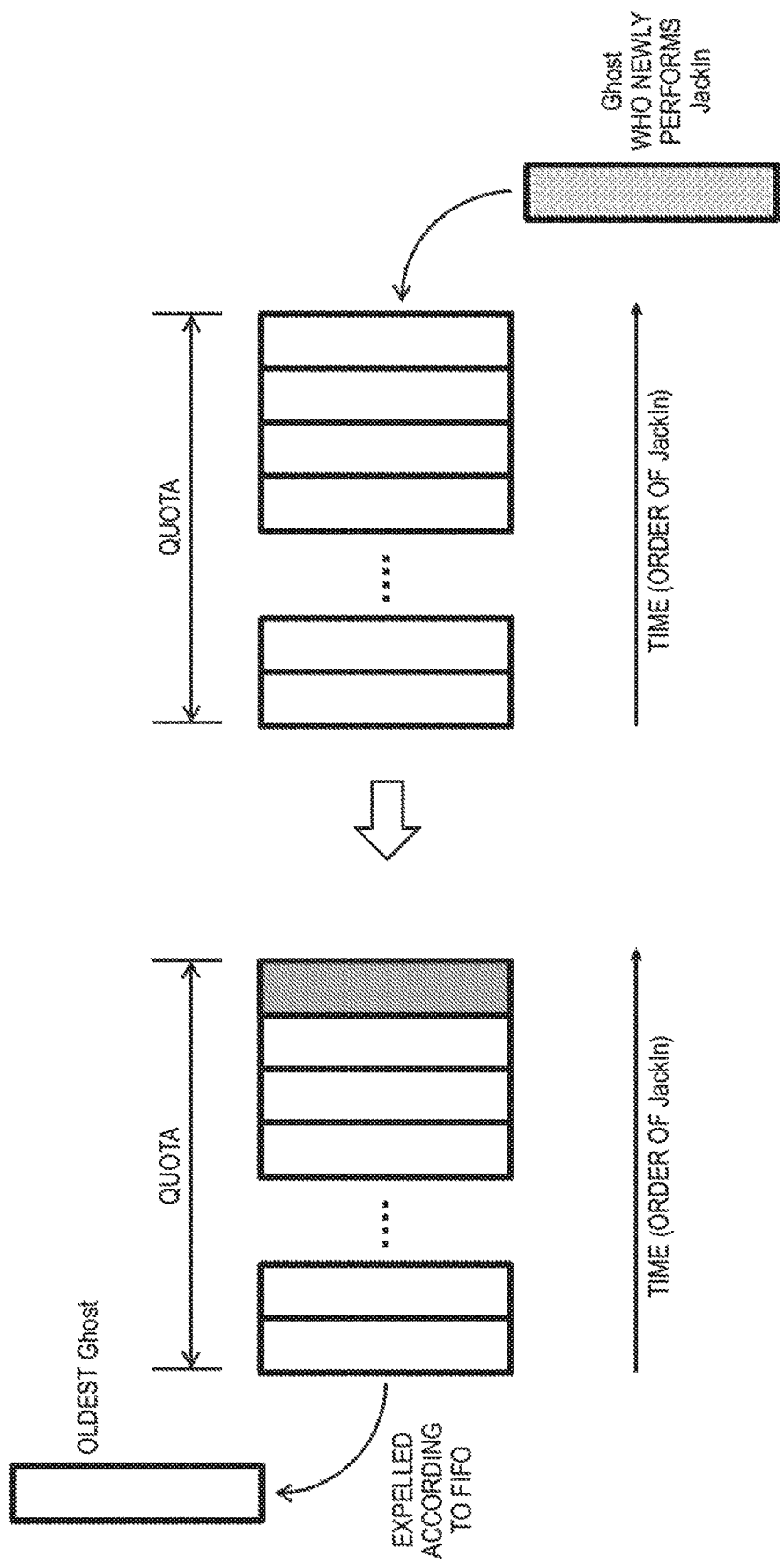
FIG. 6 is a diagram exemplifying a mechanism (FIFO method) that restricts the number of Ghosts who perform JackIn to a Body within a quota.

(1) FIFO (first in, first out) Method
(2) LIFO (last in, first out) Method
(3) Priority Method According to the FIFO method, Ghosts who have performed JackIn earlier are expelled one by one, and it is possible for a new Ghost to perform JackIN (see FIG. 6). Accordingly, it is advantageous that each Ghost is equally given an opportunity to have the same first-person experience as that of the Body.

Figure 7:
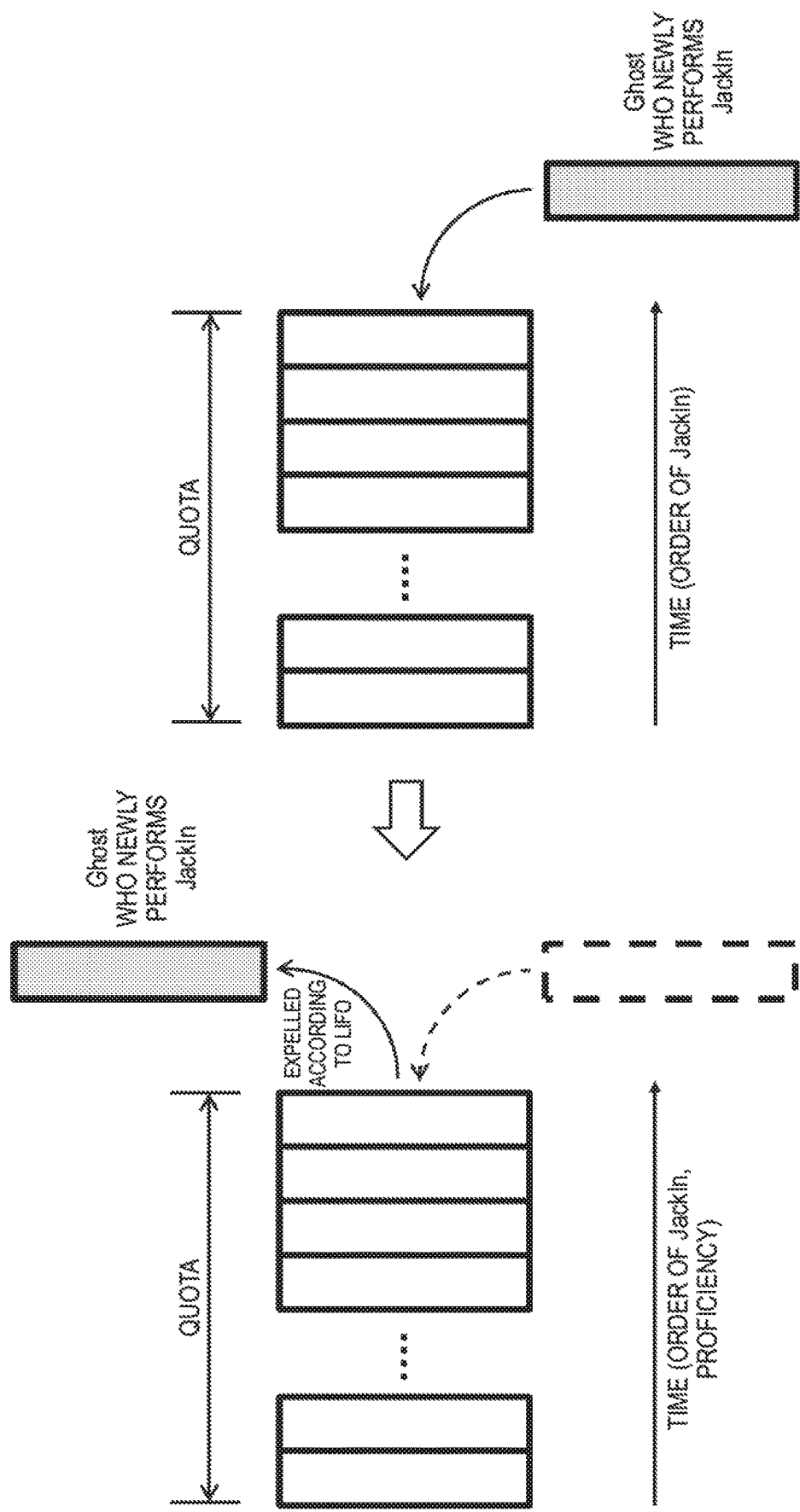
FIG. 7 is a diagram exemplifying a mechanism (LIFO method) that restricts the number of Ghosts who perform JackIn to a Body within a quota.

Meanwhile, according to the LIFO method, a Ghost who performs JackIn later is expelled (see FIG. 7), there is no opportunity for a new Ghost to perform JackIn after the quota is reached. However, it is advantageous that it is possible for the Body to keep on receiving assistance, instruction, guidance, and navigation from a Ghost who has performed JackIn earlier and is proficient at assisting a Body, or the like.

Figure 8:
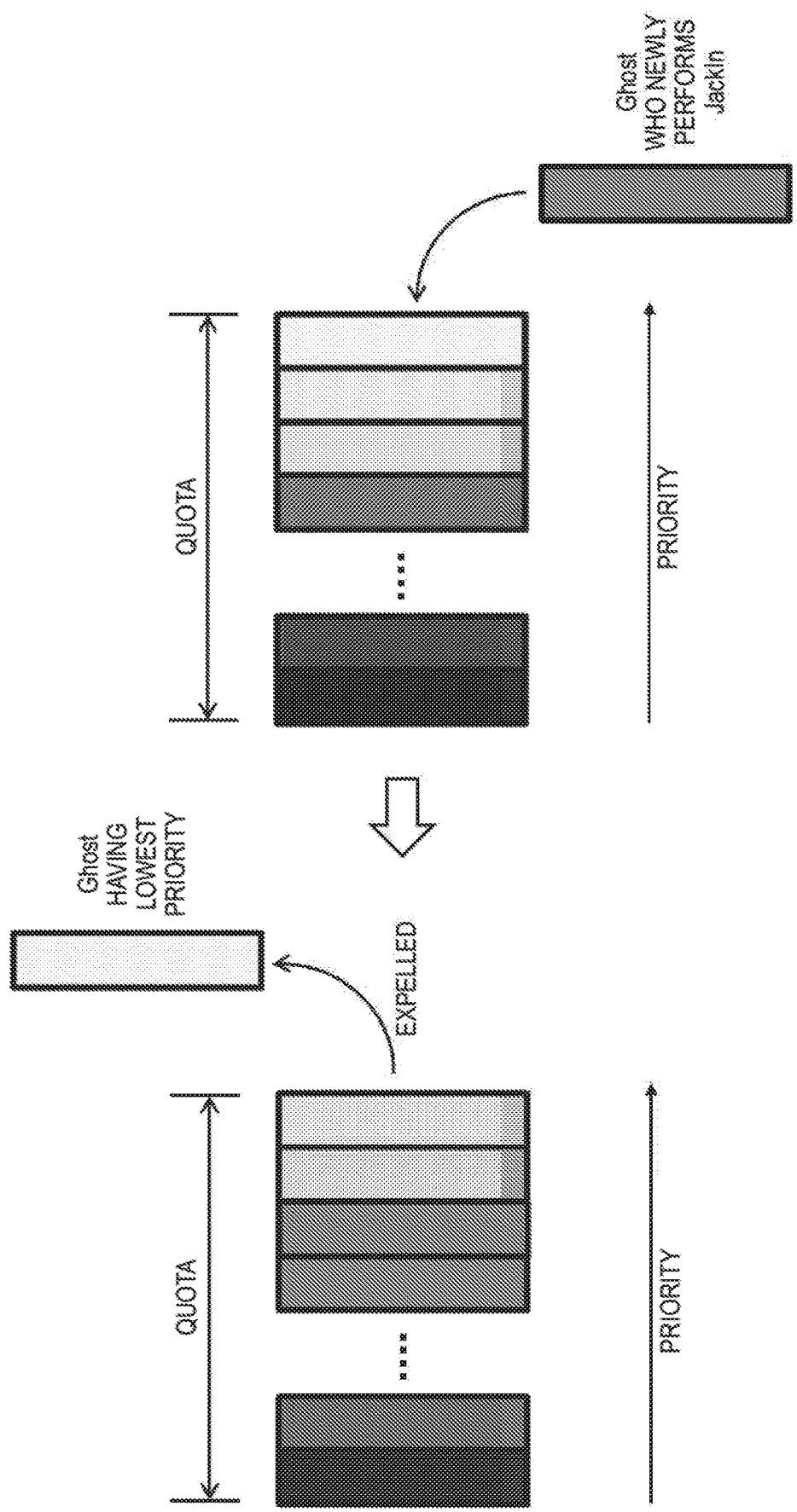
FIG. 8 is a diagram exemplifying a mechanism (priority method) that restricts the number of Ghosts who perform JackIn to a Body within a quota.

FIG. 8 illustrates a mechanism that keeps the number of Ghosts who perform JackIn to a Body in the priority method within a quota. FIG. 8 expresses priority with gradation (Ghost with a darker color has higher priority). When a Ghost newly performs JackIn, Ghosts having lower priority than that of the Ghost are expelled one by one.

In the case where the priority method is employed, there are a variety of methods for assigning priority to each Ghost. For example, priority may be assigned to each Ghost in accordance with the personal relationship with a Body, the occupation, a qualification, the past performance or review, a reputation, or the like. In addition, in the case where a Body charges for (i.e., monetizes) JackIn as a service, assigning priority in accordance with whether the charge paid by a Ghost is light or heavy makes it easier to financially support the service. Needless to say, priority to be assigned to each Ghost may be dynamically changed.

D-2. Distribution of Past Video to Expelled Ghost

A Ghost expelled because the Ghost goes beyond the quota may be completely separated from the first person view of a Body. However, video may be distributed to the Ghost beyond the quota in a method in which no excessive load is imposed on the communication band (video distribution to a Ghost within the quota is not influenced).

As an example, a method is conceivable in which real-time video is not transmitted from a Body, but provided instead of past video. According to this method, it is also possible to express a Ghost who goes beyond the quota as not being simply expelled, but being "expelled to the past."

Figure 9:
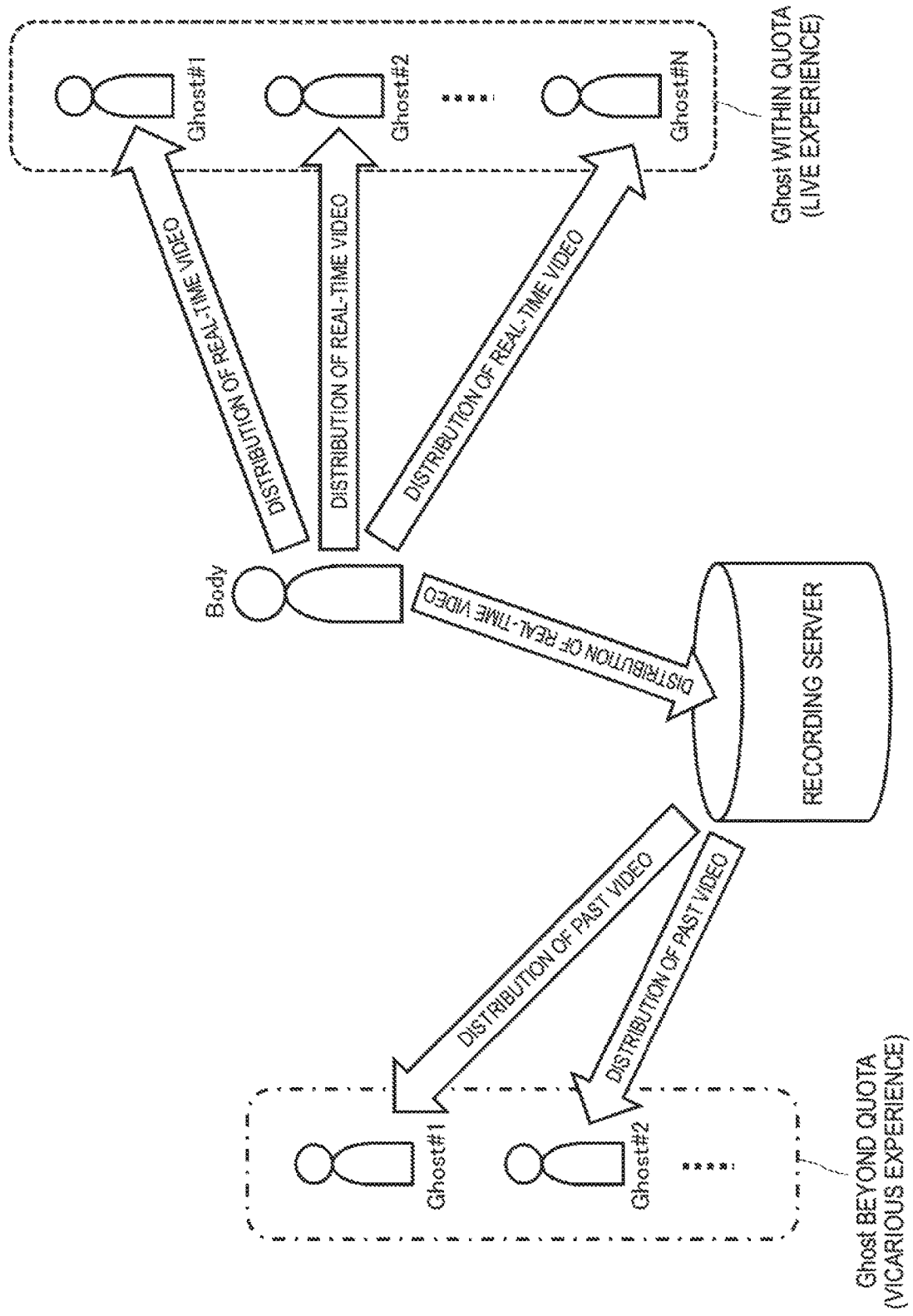
FIG. 9 is a diagram illustrating a mechanism that distributes past video of a Body to a Ghost beyond a quota.

Specifically, real-time video distributed from a Body, that is, the image providing apparatus 101 to a Ghost (within the quota) is recorded by an external apparatus, and not the Body, but the external apparatus distributes the past video to an expelled Ghost (see FIG. 9). The external apparatus here is, for example, a JackIn server (provisional name) that controls JackIn between a Body and a Ghost, or another recording server. Asking the recording server to distribute video to a Ghost beyond the quota, it is possible to share the load on a Body, that is, the image providing apparatus 101.

Video arriving at a Ghost from the external apparatus is past video delayed because of processing such as recording, but is not live video. Accordingly, the Ghost may be considered to be permitted no intervention including sight or hearing in a Body. However, accepting delays in time, the Ghost is able to vicariously have the first-person experience of the Body.

In addition, it is assumed that it is possible to include (restore) a Ghost that has been beyond the quota within the quota because a Ghost within the quota is excluded and the quota (such as a limit of the capacity for the communication band) has a vacancy. In such a case, switching video to be distributed to a Ghost from past video to real-time video causes the Ghost to lose information of the video for that time difference. Accordingly, when the distribution of past video is switched to the distribution of real-time video, video viewed by a Ghost may be made to catch up with real-time video from past video by performing the processing of so-called "chasing reproduction" or "time-shift reproduction" (see, for example, Patent Literature 6). If video is chasing-reproduced at X speed (however, X represents a value larger than 1), for example, 1.0× speed, a Ghost is able to view the chasing-reproduced video without feeling awkward, and view real-time video by seamlessly switching the video.

Figure 10:
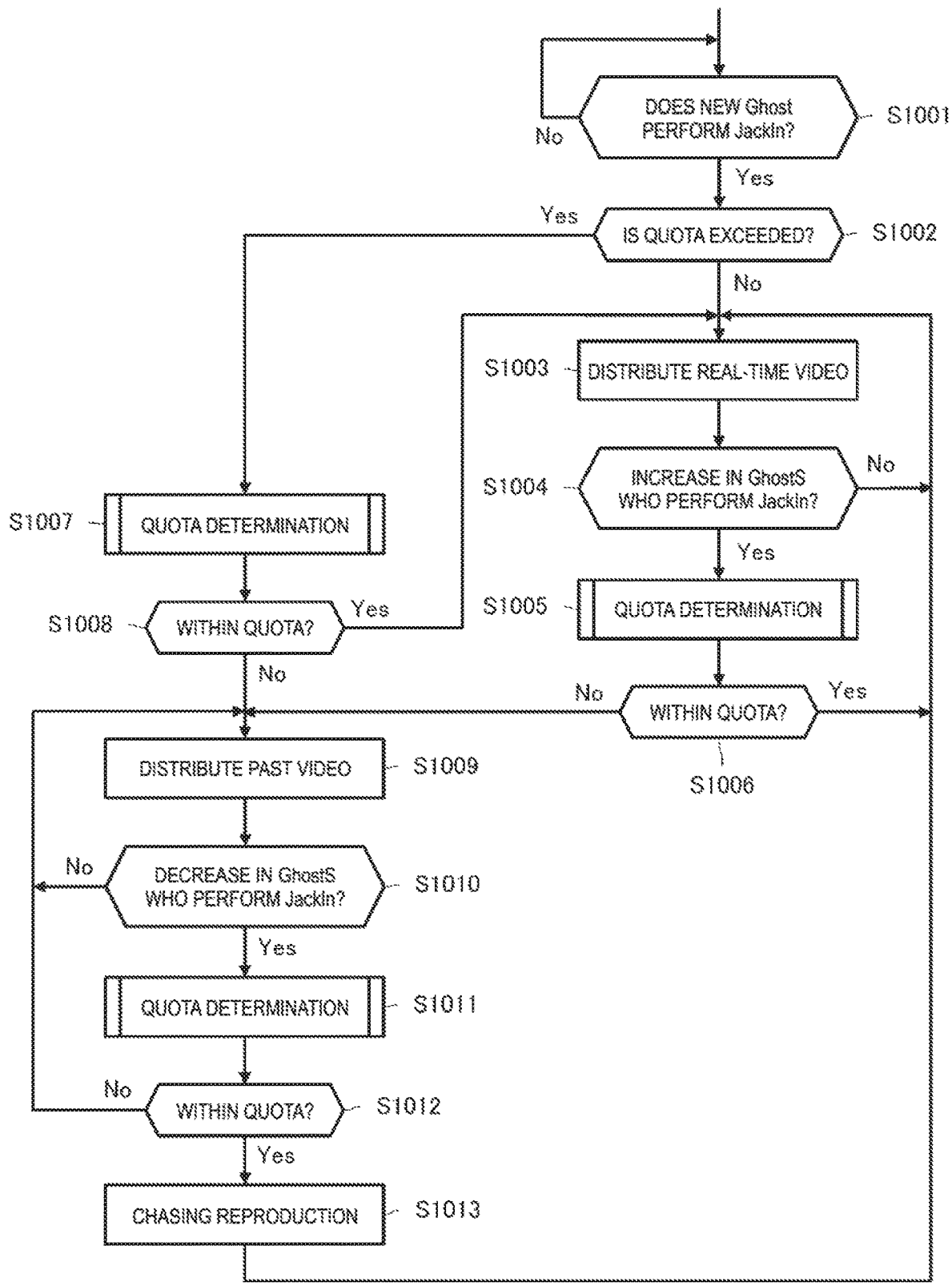
FIG. 10 is a flowchart illustrating a processing procedure for distributing a first person view to a Ghost who newly performs JackIn to a Body.

FIG. 10 illustrates a processing procedure for distributing a first person view to a Ghost who newly performs JackIn to a Body in the form of a flowchart.

When a new Ghost performs JackIn to a Body (Yes in step S1001), the Body checks whether or not the total number of Ghosts who have performed JackIn is still less than or equal to the quota (step S1002).

Here, in the case where the quota is not exceeded even if the Ghost who performs JackIn in step S1001 is added (No in step S1002), the Body starts to distribute a real-time first person view to the Ghost who performs JackIn in step S1001 (step S1003).

Meanwhile, in the case where the quota of the Body is exceeded if the Ghost who performs JackIn in step S1001 is added (Yes in step S1002), the Body performs quota determination processing of determining whether or not the Ghost who performs JackIn in step S1001 falls within the quota (in other words, whether or not the Ghost should be expelled) (step S1007). It may be determined, for example, in any of the FIFO method, the LIFO method, and the priority method described above whether or not the Ghost should be expelled.

In the case where it is determined that a Ghost who performs JackIn in step S1001 falls within the quota (Yes in step S1008), the Body starts to distribute a real-time first person view to the Ghost (step S1003).

In addition, in the case where it is determined that a Ghost who performs JackIn in step S1001 goes beyond the quota (i.e., should be expelled) (No in step S1008), a past first person view (e.g., from the recording server) is started to be distributed to the Ghost (step S1009). Not the Body (image providing apparatus 101), but the recording server distributes a past first person view, so that the video transmission load is shared (described above).

Then, when the number of Ghosts who perform JackIn to the Body decreases and there is a vacancy in the quota while a past first person view is distributed (step S1009) to the Ghost who performs JackIn in step S1001 (Yes in step S1010), the Body performs quota determination processing of determining whether or not the Ghost who performs JackIn in step S1001 should be included within the quota (step S1011). It may be determined, for example, in any of the FIFO method, the LIFO method, and the priority method described above whether or not the Ghost should be included in the quota.

In the case where it is determined that the Ghost who performs JackIn in step S1001 should not be included within the quota (i.e., should be kept expelled) (No in step S1012), the Body continuously distributes a past first person view to the Ghost (from the recording server) (step S1009).

In addition, in the case where it is determined that the Ghost who performs JackIn in step S1001 should be included within the quota (Yes in step S1012), the Body performs chasing reproduction (described above) from the recording server for the Ghost (step S1013), and then switches the distribution of the chasing-reproduced video to the distribution of a real-time first person view (step S1003).

In addition, when the number of Ghosts who perform JackIn to the Body increases and exceeds the quota while a real-time first person view is distributed to the Ghost who performs JackIn in step S1001 (step S1003) (Yes in step S1004), quota determination processing of determining whether to keep the Ghost within the quota (in other words, whether to expel the Ghost) is performed (step S1005). It may be determined, for example, in any of the FIFO method, the LIFO method, and the priority method described above whether or not the Ghost should be included within the quota.

In the case where it is determined to keep a Ghost who performs JackIn in step S1001 within the quota (Yes in step S1006), the Body continuously distributes a real-time first person view to the Ghost (step S1003).

In addition, in the case where it is determined that the Ghost who performs JackIn in step S1001 should be expelled (No in step S1006), the Body switches the distribution of video to the distribution of a past first person view (e.g., from the recording server) for the Ghost (step S1009).

If the processing procedure illustrated in FIG. 10 is followed, it is possible for a Ghost expelled for sharing the load on the Body, that is, the image providing apparatus 101 to view video distributed from the recording server, for example, with a time delay of five minutes. Then, when the Ghost is restored from the expelled state, the Ghost does not immediately view real-time video, but chasing-reproduces video at 1.05× speed or the like, and gradually (i.e., seamlessly) gets back to the video at the current time.

D-3. Solution to Quota Problem at Time of Distributing Full-Dome Video

In the case where a first person view distributed from a Body is 360-degree full-dome video, the transmission of all video to a Ghost imposes a heavy load. Meanwhile, the Ghost is not also able to observe 360-degree video, that is, video of all the areas around the Ghost. All the Ghost is able to actually observe is limited to the area within a predetermined angle of sight chiefly in the line-of-sight direction. Thus, it is of no use to distribute 360-degree full-dome video all the time.

Figure 11:
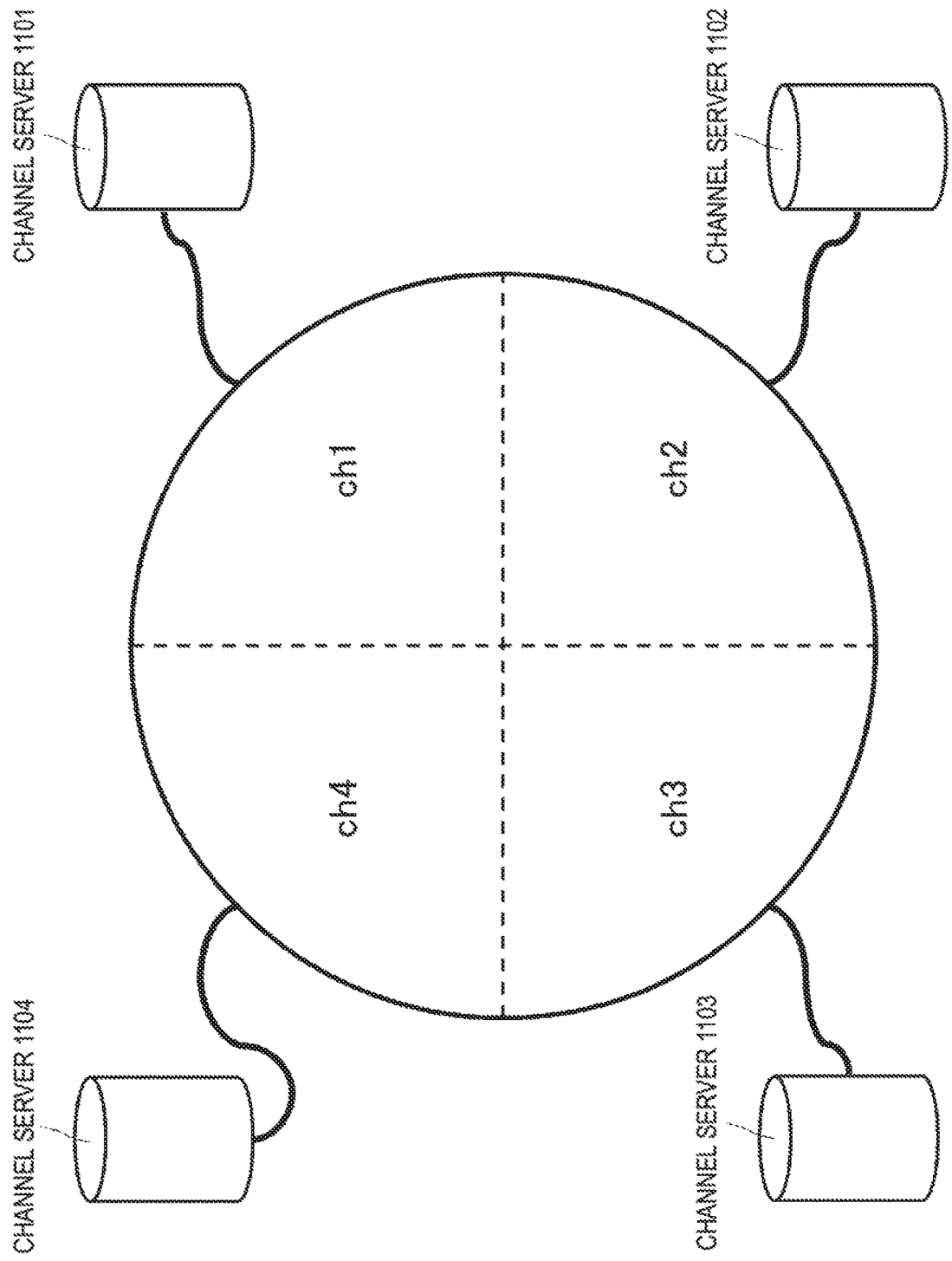
FIG. 11 is a diagram schematically illustrating that a 360-degree full dome is divided into areas each of which has a predetermined angle, full-dome video is channelized, and each channel server is installed.

Accordingly, as illustrated in FIG. 11, a method is conceivable in which a 360-degree full dome is divided into areas each of which has a predetermined angle, the full-dome video is channelized, and channel servers 1101, 1102, . . . that distribute video of the respective channels (areas) are installed to share the load of distributing full-dome video. Video is distributed to each Ghost from the channel servers 1101, 1102, . . . corresponding to the current line-of-sight direction. In addition, when the Ghost side changes the line-of-sight direction, switching channel servers accordingly makes it possible to view video adapted to the line-of-sight direction.

Figure 12:
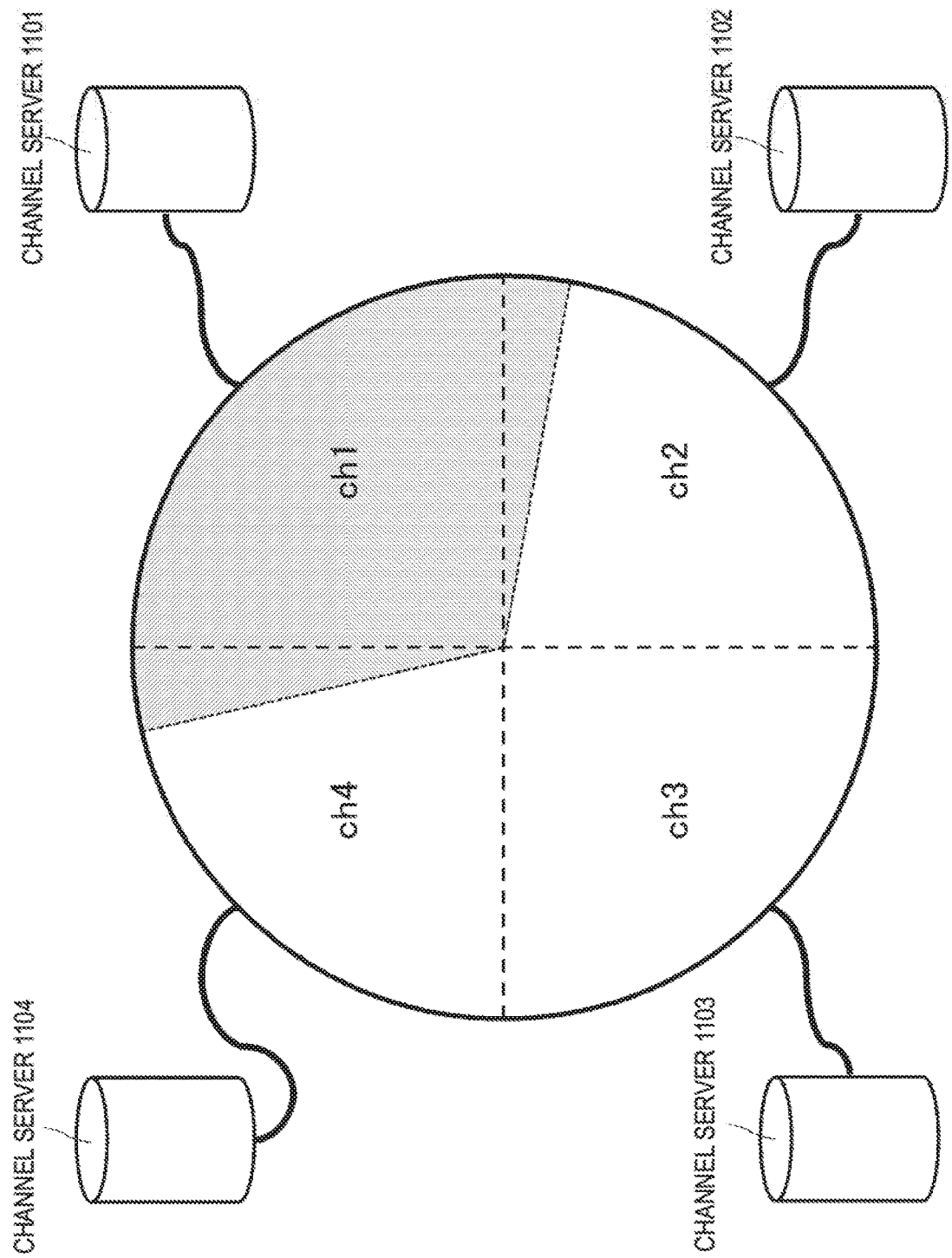
FIG. 12 is a diagram illustrating that a channel server 1101 distributes video of an area that overlaps with areas of adjacent channels ch2 and ch3.

It is preferable that the angles (central angles) at which a full dome is divided into areas be large enough to cover the human's angle of sight. In the example illustrated in FIG. 11, for the sake of figure simplification, a full dome is divided at 90 degrees into the four areas of channels ch1, ch2, . . . , and video of the respective areas is distributed from the channel servers 1101, 1102, . . . . In addition, it is preferable to produce video of each channel such that video of the border between adjacent areas (channels) overlaps to prevent the border between the areas from showing or prevent video from breaking up when switching channels. FIG. 12 illustrates that the channel server 1101 distributes video of the area overlapping with the areas of the adjacent channels ch2 and ch3.

As described above, by channelizing full-dome video to make it possible to distribute video for each channel (area) from a different channel server, it is possible to share the load of distributing the full-dome video.

However, it is assumed that the viewing angle of a Ghost concentrates on one part of a full dome. For example, in the case where full-dome video of a Body enjoying or watching a concert is distributed, the viewing angle of a Ghost tends to concentrate on the stage or a particular artist.

Figure 13:
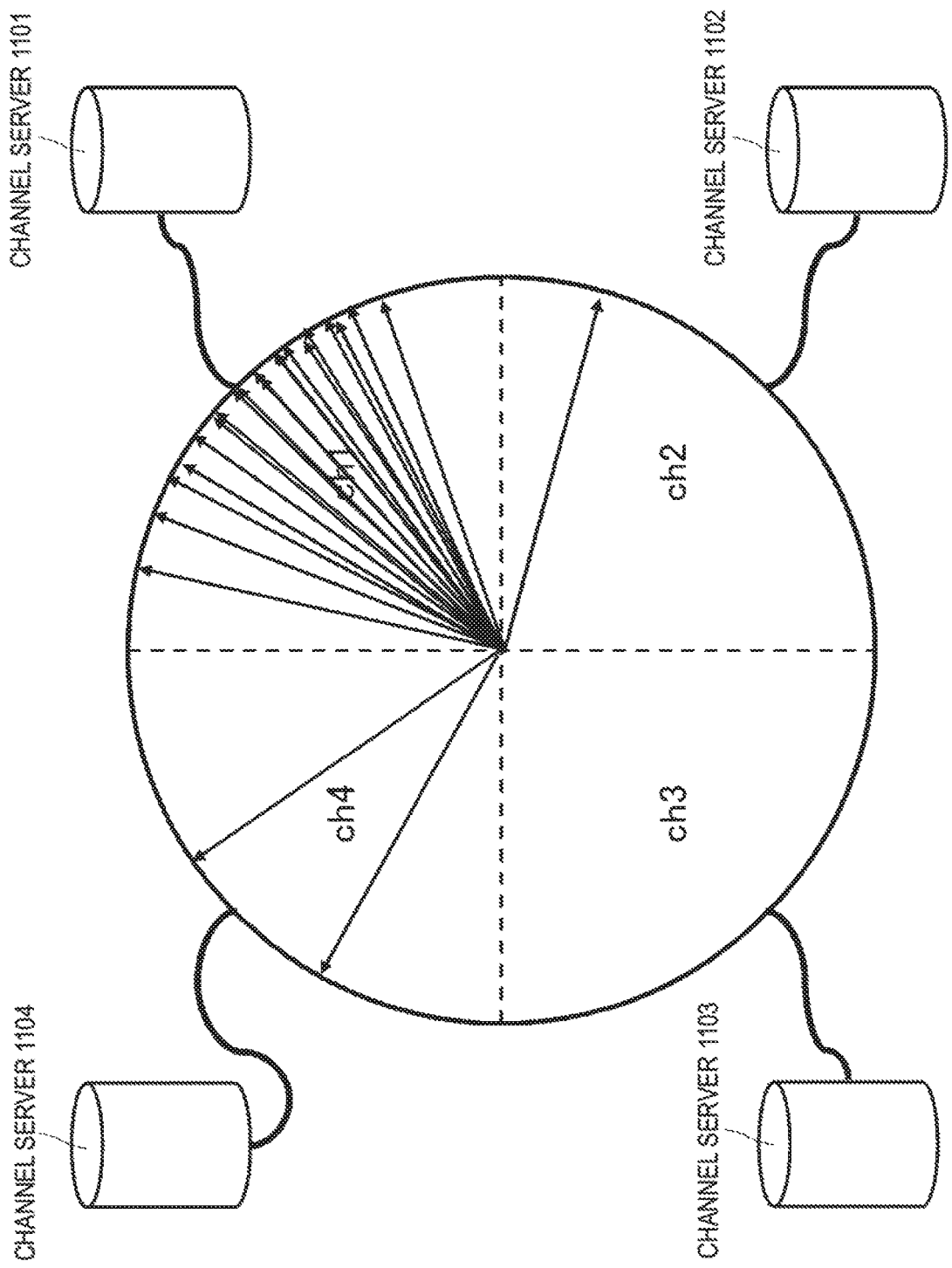
FIG. 13 is a diagram illustrating that lines of sight concentrate on a part of viewing angles in full-dome video.

FIG. 13 exemplifies the viewing angle of each Ghost viewing full-dome video of a Body. The situation is assumed in FIG. 13 in which an arrow represents a line-of-sight direction from the viewpoint position at the center. In the illustrated example, viewing angles concentrate in the channel ch1, so that the transmission load concentrates on the channel server 1101.

To avoid such a situation, a quota may be set on viewable Ghosts for each channel server, in other words, for each area of full-dome video, and the processing of expelling a Ghost as described in Section D-1 may be performed. As described above, it is possible to select a Ghost to be expelled from the area by using the FIFO method, the LIFO method, or the priority method.

In this way, a request of access to video that satisfies a predetermined condition and has a particular direction may be restricted. The particular direction may be regarded as a direction in which viewing angles concentrate, that is, a particular viewing direction.

In addition, a Ghost expelled because the Ghost goes beyond the quota may be completely separated from the first person view of a Body. However, video may be distributed to the Ghost beyond the quota in a method in which no excessive load is imposed on the communication band (video distribution to a Ghost within the quota is not influenced).

In Section D-2 described above, the load sharing is attempted by distributing past video of a Body to a Ghost beyond the quota. In the case where full-dome video is distributed, it is possible to share the load on a channel server by asking a Ghost beyond the quota to view video of an adjacent area (i.e., video having an adjacent line-of-sight direction) instead. In addition, by controlling the resolution of video to be transmitted in accordance with the priority (e.g., transmitting to the degree of video having lower resolution to a Ghost having lower priority), it may be possible to reduce the load on a channel server and try to distribute video from a channel server desired by the Ghost.

In addition, it is assumed that it is possible to include (restore) a Ghost that has been beyond the quota within the quota because a Ghost within the quota is excluded and the quota (such as a limit of the capacity for the communication band) of the channel server has a vacancy. In such a case, when video to be distributed to a Ghost is immediately switched from video having the viewing angle of an adjacent area to video having the original viewing angle, the Ghost ends up losing information of the video between the viewing angles. The viewing angle may be then switched not immediately to the original viewing angle, but gradually from the viewing angle of an adjacent area. If the viewing angle is gradually shifted, the Ghost is able to view video having a desired viewing angle without feeling awkward by seamlessly switching the video.

Figure 14:
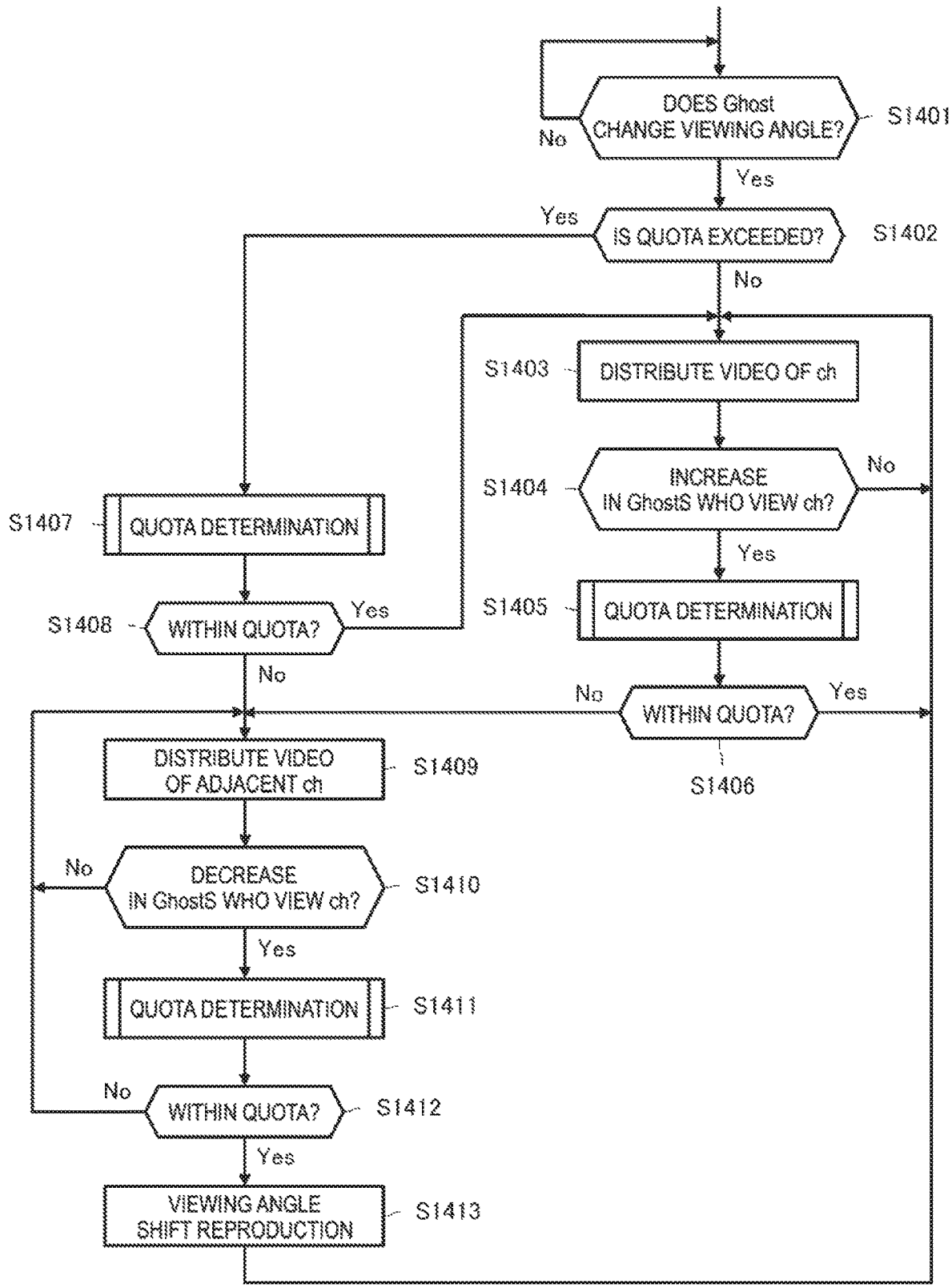
FIG. 14 is a flowchart illustrating a processing procedure for distributing full-dome video of a Body to a Ghost.

FIG. 14 illustrates a processing procedure for distributing full-dome video of a Body to a Ghost in the form of a flowchart.

When a Ghost who has performed JackIn to a Body changes the viewing angle (Yes in step S1401), it is checked whether the total number of Ghosts viewing the area (channel) including the viewing angle is still less than or equal to the quota (step S1402). Here, it is assumed that "when a Ghost changes the viewing angle" includes the case where a new Ghost performs JackIn to a Body.

Here, in the case where the quota of the area (channel) including the viewing angle changed by the Ghost is not exceeded (No in step S1402), the Body starts to distribute video to the Ghost at the desired viewing angle (step S1403).

Meanwhile, in the case where the quota of the area (channel) including the viewing angle changed by the Ghost is exceeded (Yes in step S1402), the Body performs quota determination processing of determining whether or not the Ghost falls within the quota of the area (channel) (in other words, whether or not the Ghost should be expelled from the area (channel)) (step S1407). It may be determined, for example, in any of the FIFO method, the LIFO method, and the priority method described above whether or not the Ghost should be expelled.

In the case where it is determined that the Ghost who changes the viewing angle in step S1401 falls within the quota of the area (channel) (Yes in step S1408), the Body starts to distribute video to the Ghost at the desired viewing angle (step S1403).

In addition, in the case where it is determined that the Ghost who changes the viewing angle in step S1401 goes beyond the quota of the area (channel) (i.e., the Ghost should be expelled) (No in step S1408), not video of the area (channel) having the changed viewing angle, but video of an area (channel) adjacent thereto is started to be distributed to the Ghost (step S1409). The video of the adjacent area is distributed by another channel server whose quota is not exceeded, so that the load of the video transmission is shared (described above).

Then, when the number of Ghosts viewing the area (channel) including the original viewing angle (i.e., changed in step S1401) decreases and there is a vacancy in the quota while the video of the adjacent area (channel) is distributed to the Ghost who changes the viewing angle in S1401 (step S1409) (Yes in step S1410), the Body performs quota determination processing whether or not the Ghost who changes the viewing angle in step S1401 should be included within the quota of the desired area (channel) (step S1411). It may be determined, for example, in any of the FIFO method, the LIFO method, and the priority method described above whether or not the Ghost should be included within the quota.

In the case where it is determined that the Ghost who changes the viewing angle in S1401 should not be included within the quota of the desired area (channel) (i.e., should be kept expelled) (No in step S1412), the Body continuously distributes video of the adjacent area (channel) to the Ghost (step S1409).

In addition, in the case where it is determined that the Ghost who changes the viewing angle in step S1401 should be included within the quota of the desired area (channel) (Yes in step S1412), the Body performs viewing angle shift reproduction for the Ghost (step S1413), and then switches the distribution of video to the distribution of video at the desired viewing angle (step S1403).

In addition, when another Ghost changes the viewing angle into the same area (channel) and the quota is exceeded while the video of the desired area (channel) is distributed to the Ghost who changes the viewing angle in step S1401 (step S1403) (Yes in step S1404), quota determination processing of determining whether to keep the Ghost within the quota (in other words, whether to expel the Ghost) is performed (step S1405). It may be determined, for example, in any of the FIFO method, the LIFO method, and the priority method described above whether or not the Ghost should be included within the quota.

In the case where it is determined to keep the Ghost who changes the viewing angle in step S1401 within the quota (Yes in step S1406), the Body continuously distributes video having the desired viewing angle to the Ghost (step S1403).

In addition, in the case where it is determined that the Ghost who changes the viewing angle in step S1401 should be expelled (No in step S1406), the Body distributes video of the adjacent area (channel) to the Ghost by switching the video (step S1409).

According to the processing procedure illustrated in FIG. 14, it is possible to allow a Ghost expelled for sharing the load on a channel server to view video of an adjacent area. Then, when the Ghost is restored from the expelled state, the Ghost does not immediately view again video having a desired viewing angle, but performs viewing angle shift reproduction and gradually gets back to the video having the desired viewing angle.

INDUSTRIAL APPLICABILITY

The above describes the technology disclosed in this specification in detail with reference to specific embodiments. However, it is obvious that persons skilled in the art may make modifications and substitutions to these embodiments without departing from the spirit of the technology disclosed in this specification.

The technology disclosed in the present specification is usable for, for example, operation support and the like in various industrial fields such as a medical field including surgery and the like, a construction site of a construction work and the like, the control of airplanes and helicopters, the navigation of a driver of an automobile, an instruction in sports, and the like.

In addition, in the present specification, an embodiment of a system in which a Ghost who shares a first person image of a Body who acts on a site with his/her body with the Body intervenes in the sight, the hearing, or the like of the Body has been mainly described. However, the gist of the technology disclosed in the present specification is not limited thereto. It is also possible to apply the technology disclosed in the present specification to various information processing apparatuses that display, on the vision of a certain person, information regarding assistance, instruction, guidance, and navigation from another person.

In short, the technology disclosed in the present specification has been described by way of example, and the stated content of the present specification should not be interpreted as being limiting. The gist of the technology disclosed in the present specification should be determined in consideration of the claims.

Additionally, the technology disclosed in the present specification can also be configured as below.

(1)

An information terminal apparatus connectable to an imaging unit and a sound input unit, the information terminal apparatus including:

a control unit;

a communication unit;

an access reception unit configured to receive access from an external information processing apparatus; and a setting unit configured to, when the access reception unit receives access from an information processing apparatus exceeding a predetermined condition, set priority according to which information is provided to each information processing apparatus, in which the control unit transmits image information input from the imaging unit to the information processing apparatus via the communication unit on a basis of the priority set by the setting unit.

(2)

The information terminal apparatus according to (1), in which when access is received from an information processing apparatus exceeding, as the predetermined condition, a limit of capacity of the communication unit for a communication band or a limit of a number of times access is received, the setting unit sets the priority.

(3)

The information terminal apparatus according to (1), in which the control unit changes an order, a reproduction time, an angle, or resolution, and transmits image information from the communication unit in accordance with the priority.

(4)

The information terminal apparatus according to (3), in which the control unit transmits current video to an information processing apparatus remaining in the predetermined condition from the communication unit, and transmits past video to an information processing apparatus exceeding the predetermined condition from the communication unit in accordance with the priority.

(5)

The information terminal apparatus according to (3), in which when access to video having a particular line-of-sight direction exceeds a predetermined condition, the control unit transmits the video having the particular line-of-sight direction to an information processing apparatus remaining in the predetermined condition from the communication unit, and transmits video having a direction other than the particular line-of-sight direction to the information processing apparatus exceeding the predetermined condition from the communication unit in accordance with the priority.

(6)

The information terminal apparatus according to (3), in which the control unit transmits video having first resolution to an information processing apparatus remaining the predetermined condition from the communication unit, and transmits video having second resolution lower than the first resolution to the information processing apparatus exceeding the predetermined condition from the communication unit in accordance with the priority.

(7)

The information terminal apparatus according to (1), in which the setting unit sets priority of each information processing apparatus on a basis of information specific to an information processing apparatus or information regarding an attribute of a user of an information processing apparatus.

(8)

The information terminal apparatus according to (1), in which the setting unit sets priority of each information processing apparatus on a basis of an order of access of the access reception unit.

(9)

A control method for an information terminal apparatus connectable to an imaging unit and a sound input unit, the control method including:

an access reception step of receiving access from an external information processing apparatus;

a setting step of setting, when access is received in the access reception step from an information processing apparatus exceeding a predetermined condition, priority according to which information is provided to each information processing apparatus;

a control step of controlling, on a basis of the priority set in the setting step, transmission of image information input from the imaging unit to the information processing apparatus.

(10)

An information processing apparatus that accesses an information terminal apparatus capable of connecting an imaging unit and a sound input unit, the information processing apparatus including:

a control unit;

a communication unit; and an access transmission unit configured to transmit access to the information terminal apparatus, in which in a case where a predetermined condition is exceeded in the information terminal apparatus accessed by the access transmission unit, the control unit receives image information input from the imaging unit from the information terminal apparatus via the communication unit on a basis of priority set for the information processing apparatus.

(11)

A control method for an information processing apparatus that accesses an information terminal apparatus capable of connecting an imaging unit and a sound input unit, the control method including:

an access transmission step of transmitting access the information terminal apparatus; and an information reception step of receiving, in a case where a predetermined condition is exceeded in the information terminal apparatus accessed in the access transmission step, image information input from the imaging unit from the information terminal apparatus via the communication unit on a basis of priority set for the information processing apparatus.

(12)

A server apparatus interposed between an information terminal apparatus that is connectable to an imaging unit and a sound input unit, and an information processing apparatus that accesses the information terminal apparatus, the server apparatus including:

an access reception unit configured to receive access to the information terminal apparatus from the information processing apparatus;

a setting unit configured to, when the access reception unit receives access from an information processing apparatus exceeding a predetermined condition, set priority according to which information is provided to each information processing apparatus; and a control unit configured to, on a basis of the priority set by the setting unit, control transmission of image information input from the imaging unit into the information terminal apparatus to the information processing apparatus.

(13)

A control method for a server apparatus interposed between an information terminal apparatus that is connectable to an imaging unit and a sound input unit, and an information processing apparatus that accesses the information terminal apparatus, the control method including:

an access reception step of receiving access to the information terminal apparatus from the information processing apparatus;

a setting step of setting, when access is received in the access reception step from an information processing apparatus exceeding a predetermined condition, priority according to which information is provided to each information processing apparatus; and a control step of controlling, on a basis of the priority set in the setting step, transmission of image information input from the imaging unit into the information terminal apparatus to the information processing apparatus.

(14)

An information processing apparatus including:

an access reception unit configured to receive requests of direct or indirect access to content information associated with a first user from information terminal apparatuses of a plurality of second users; and a control unit configured to control provision of information to each of the information terminal apparatuses on a basis of set priority when a predetermined condition regarding the received requests of access is satisfied.

(15)

The information processing apparatus according to (14), in which the predetermined condition is a condition that a parameter regarding the received requests of access exceeds a predetermined value.

(16)

The information processing apparatus according to (15), in which the parameter is capacity of a communication unit for a communication band, the communication unit providing the information by transmitting at least part of the content information to the information terminal apparatuses, and the predetermined condition is a condition that the capacity for the communication band exceeds a limit value.

(17)

The information processing apparatus according to (15), in which the parameter is a number of the requests of access, and the predetermined condition is a condition that the number of the requests of access exceeds a limit value.

(18)

The information processing apparatus according to (17), in which the limit value is a maximum number of the information terminal apparatuses capable of accessing the content information in real time.

(19)

The information processing apparatus according to any of (14) to (18), in which the control unit differentiates a parameter of image information regarding the provision of the information in accordance with the set priority.

(20)

The information processing apparatus according to (19), in which the parameter of the image information includes at least one of an order in which the information is provided to the information terminal apparatuses, a reproduction time, an angle of an image to be provided, or resolution of the image to be provided.

(21)

The information processing apparatus according to any of (14) to (20), in which the information terminal apparatuses include at least a first information terminal apparatus having relatively high priority as the set priority, and a second information terminal apparatus having relatively low priority as the set priority.

(22)

The information processing apparatus according to (21), in which when the received requests of access satisfy the predetermined condition, the control unit controls provision of information of current video to the first information terminal apparatus, and controls provision of information of past video to the second information terminal apparatus.

(23)

The information processing apparatus according to (21), in which when a request of access to video having a particular direction as the content information satisfies the predetermined condition, the control unit controls provision of information of the video having the particular direction to the first information terminal apparatus, and controls provision of information of video different from the video having the particular direction to the second information terminal apparatus.

(24)

The information processing apparatus according to any of (21) to (23), in which the first information terminal apparatus is an information terminal apparatus that makes a request of access to the content information earlier than the second information terminal apparatus.

(25)

The information processing apparatus according to any of (21) to (23), in which the control unit controls provision of information of video having first resolution to the first information terminal apparatus, and controls provision of information of video having second resolution lower than the first resolution to the second information terminal apparatus.

(26)

The information processing apparatus according to any of (14) to (23), and (25), further including:

a setting unit configured to set priority of each of the information terminal apparatuses on a basis of relevant information of the information terminal apparatuses.

(27)

The information processing apparatus according to (26), in which the relevant information of the information terminal apparatuses includes information specific to the information terminal apparatuses.

(28)

The information processing apparatus according to (26), in which the relevant information of the information terminal apparatuses includes attribute information of the second users.

(29)

The information processing apparatus according to any of (14) to (28), further including:

a communication unit configured to communicate with the information terminal apparatuses serving as external apparatuses; and a housing configured to allow the first user to carry the setting unit, the communication unit, and the access reception unit, in which the control unit controls at least one of an imaging unit or a sound input unit connectable to the information processing apparatus.

(30)
The information processing apparatus according to any of (14) to (29), in which
the information processing apparatus is a server apparatus on a network, the server apparatus directly or indirectly connecting communication between an information terminal apparatus of the first user and the information terminal apparatuses of the second users.

(31)
A control method for an information processing apparatus, the control method including:
an access reception step of receiving requests of direct or indirect access to content information associated with a first user from information terminal apparatuses of a plurality of second users; and a control step of controlling provision of information to each of the information terminal apparatuses on a basis of set priority when a predetermined condition regarding the received requests of access is satisfied.

(32)
A computer program described in a computer-readable format, the computer program causing a computer to execute:
an access reception step of receiving requests of direct or indirect access to content information associated with a first user from information terminal apparatuses of a plurality of second users; and
a control step of controlling provision of information to each of the information terminal apparatuses on a basis of set priority when a predetermined condition regarding the received requests of access is satisfied.

REFERENCE SIGNS LIST 100 visual information sharing system
101 image providing apparatus
102 image display apparatus
501 imaging unit
502 image processing unit
503 display unit
504 first sound output unit
505 drive unit
506 second sound output unit
507 position detection unit
508 communication unit
509 control unit
510 setting unit
511 communication unit
512 image decoding unit
513 display unit
514 user input unit
515 position attitude detection unit
521 sound input unit
522 sound processing unit

The invention claimed is:

1. A distribution control apparatus comprising:
at least one processor configured to execute instructions stored in a memory for performing steps to:
distribute, in response to at least one first request and at least one second request transmitted from at least one first display apparatus and at least one second display apparatus respectively, a streaming video that has a field-of-view divided into at least a first area and a second area, which are each large enough to cover a human's angle of sight and are part of a plurality of areas which represent a 360-degree image wherein each area is streamed on its own communication channel,
the first area and the second area depicting different portions of a space representing current lines of sight, wherein
the at least one first request is a request for accessing the first area, wherein the first area represents a concentration of the current lines of sight, and
the at least one second request is a request for accessing the second area, wherein the second area is adjacent to the first area and overlaps a border of the first area;
in a case where the number of the at least one first request is larger than the number of the at least one second request, distribute the first area and the second area to the at least one first display apparatus and the at least one second display apparatus respectively while reducing a resolution of the first area relative to a resolution of the second area, wherein the communication channel associated with the first area has a reduction of its load; and
upon determining that a current line of sight has changed to a new line of sight, distribute an adjusted real-time video comprising at least a new area representing the new line of sight.

2. The distribution control apparatus according to claim 1, wherein
the at least one processor is configured to reduce the resolution of the first area in a case where a capacity for the communication channel related to the first area exceeds a limit value in response to an increase in the number of the at least one first request.

3. The distribution control apparatus according to claim 1, further comprising:
the processor executing instructions to:
enable an imaging unit to acquire the streaming video;
enable a communication unit to transmit the streaming video to the at least one first display apparatus and the at least one second display apparatus via a wireless network; and
a mobile housing that contains the at least one processor, the communication unit, and the imaging unit.

4. The distribution control apparatus according to claim 1, wherein
the distribution control apparatus is a server apparatus including a first channel server and a second channel server distributing the first area and the second area respectively.

5. The distribution control apparatus according to claim 1, wherein the field-of-view of the streaming video is 180 degrees or more, and
each of the first area and the second area has a field of view of more than 90 degrees.

6. A distribution control method comprising:
distributing, in response to at least one first request and at least one second request transmitted from at least one first display apparatus and at least one second display apparatus respectively, a streaming video that has a field-of-view divided into at least a first area and a second area, which are each large enough to cover a human's angle of sight and are part of a plurality of areas which represent a 360-degree image wherein each area is streamed on its own communication channel,
the first area and the second area depicting different portions of a space, representing current lines of sight, wherein
the at least one first request is a request for accessing the first area, wherein the first area represents a concentration of the current lines of sight, and the at least one second request is a request for accessing the second area, wherein the second area is adjacent to the first area and overlaps a border of the first area;

in a case where the number of the at least one first request is larger than the number of the at least one second request, distributing the first area and the second area to the at least one first display apparatus and the at least one second display apparatus respectively while reducing a resolution of the first area relative to a resolution of the second area, wherein the communication channel associated with the first area has a reduction of its load; and upon determining that a current line of sight has changed to a new line of sight, distribute an adjusted real-time video comprising at least a new area representing the new line of sight.

7. At least one non-transitory computer-readable medium encoded with instructions which, when executed by at least one processor of an apparatus, cause the apparatus to:

distribute, in response to at least one first request and at least one second request transmitted from at least one first display apparatus and at least one second display apparatus respectively, a streaming video that has a field-of-view divided into at least a first area and a second area, which are each large enough to cover a human's angle of sight and are part of a plurality of areas which represent a 360-degree image wherein each area is streamed on its own communication channel, the first area and the second area depicting different portions of a space representing current lines of sight, wherein the at least one first request is a request for accessing the first area, wherein the first area represents a concentration of the current lines of sight, and the at least one second request is a request for accessing the second area wherein the second area is adjacent to the first area and overlaps a border of the first area;

in a case where the number of the at least one first request is larger than the number of the at least one second request, distribute the first area and the second area to the at least one first display apparatus and the at least one second display apparatus respectively while reducing a resolution of the first area relative to a resolution of the second area, wherein the communication channel associated with the first area has a reduction of its load; and upon determining that a current line of sight has changed to a new line of sight, distribute an adjusted real-time video comprising at least a new area representing the new line of sight.

\* \* \* \* \*